US011178517B2

(12) United States Patent
Yang et al.

(10) Patent No.: US 11,178,517 B2
(45) Date of Patent: Nov. 16, 2021

(54) METHOD FOR CHANGING GROUP TYPE AND GROUP CREATION METHOD AND DEVICE

(71) Applicant: Dingtalk Holding (Cayman) Limited, Grand Cayman (KY)

(72) Inventors: Boyu Yang, Hangzhou (CN); Lili Zhang, Zhejiang (CN); Xinglin Ma, Hangzhou (CN); Deyan Che, Hangzhou (CN); Di Zhang, Hangzhou (CN)

(73) Assignee: Dingtalk Holding (Cayman) Limited, Grand Cayman (KY)

( * ) Notice: Subject to any disclaimer, the term of this patent is extended or adjusted under 35 U.S.C. 154(b) by 0 days.

(21) Appl. No.: 16/797,612

(22) Filed: Feb. 21, 2020

(65) Prior Publication Data

US 2020/0196111 A1  Jun. 18, 2020

Related U.S. Application Data

(63) Continuation of application No. PCT/CN2018/100648, filed on Aug. 15, 2018.

(30) Foreign Application Priority Data

Aug. 24, 2017 (CN) .................. 201710735258.X
Nov. 8, 2017 (CN) .................. 201711089823.6

(51) Int. Cl.
*H04W 4/08* (2009.01)
*H04L 12/58* (2006.01)
*H04M 3/42* (2006.01)

(52) U.S. Cl.
CPC .............. *H04W 4/08* (2013.01); *H04L 51/12* (2013.01); *H04M 3/42382* (2013.01); *H04M 2203/2044* (2013.01)

(58) Field of Classification Search
CPC ..... H04L 12/1822; H04L 51/04; H04L 51/12; H04L 67/1044; H04M 2203/2044; H04M 3/42382; H04M 7/0042; H04W 4/08
(Continued)

(56) References Cited

U.S. PATENT DOCUMENTS 7,321,969 B2  1/2008 Schoen et al.
7,620,630 B2  11/2009 Lloyd et al.
(Continued)

FOREIGN PATENT DOCUMENTS

CN       1878073 A   12/2006
CN    101044770 A    9/2007
(Continued)

OTHER PUBLICATIONS

Translation of Chinese International Search Report dated Nov. 6, 2018, from corresponding CN PCT Application No. PCT/CN2018/100648, 2 pages.
(Continued)

*Primary Examiner* — Tan H Trinh
(74) *Attorney, Agent, or Firm* — Lee & Hayes, P.C.

(57) ABSTRACT

A method including determining, according to a received type change instruction with respect to a group, a target group type of the group; selecting, according to a limiting condition imposed on group affiliation information of a group member by the target group type, a group member who does not satisfy the limiting condition; and removing the selected group member from the group.

20 Claims, 25 Drawing Sheets

(58) Field of Classification Search
USPC .............................. 455/41.2, 518, 519, 404.1
See application file for complete search history.

(56) References Cited

U.S. PATENT DOCUMENTS

| | | | |
|---|---|---|---|
| 8,825,878 B2 | 9/2014 | Klassen et al. | |
| 8,983,518 B2 | 3/2015 | Hung et al. | |
| 9,009,264 B2 | 4/2015 | Klassen et al. | |
| 9,256,861 B2 | 2/2016 | Blattner | |
| 9,584,987 B1* | 2/2017 | Bar-On | H04W 4/08 |
| 10,298,410 B2 | 5/2019 | Whalin | |
| 10,326,717 B2 | 6/2019 | Karstens | |
| 2003/0083086 A1* | 5/2003 | Toyryla | H04W 8/186 |
| | | | 455/518 |
| 2003/0186716 A1 | 10/2003 | Dorenbosch et al. | |
| 2003/0204722 A1 | 10/2003 | Schoen | |
| 2004/0083297 A1 | 4/2004 | Gazzetta | |
| 2006/0277213 A1* | 12/2006 | Robertson | H04L 63/0263 |
| 2007/0106674 A1* | 5/2007 | Agrawal | G06Q 30/02 |
| 2008/0077309 A1* | 3/2008 | Cobbold | G06Q 10/10 |
| | | | 701/117 |
| 2008/0091682 A1 | 4/2008 | Lim | |
| 2010/0177661 A1* | 7/2010 | Dailey | H04W 4/08 |
| | | | 370/254 |
| 2011/0235788 A1* | 9/2011 | Jesse | H04L 51/28 |
| | | | 379/88.22 |
| 2013/0059622 A1* | 3/2013 | Agulnik | H04W 4/08 |
| | | | 455/518 |
| 2014/0019542 A1* | 1/2014 | Rao | G06Q 30/0269 |
| | | | 709/204 |
| 2014/0349698 A1* | 11/2014 | Burks | H04W 76/28 |
| | | | 455/518 |
| 2015/0039700 A1 | 2/2015 | West | |
| 2015/0058135 A1* | 2/2015 | Kelly | G06Q 30/0269 |
| | | | 705/14.66 |
| 2015/0079919 A1* | 3/2015 | Shahaf | H04M 3/568 |
| | | | 455/404.1 |
| 2015/0079920 A1* | 3/2015 | McDonald | H04L 65/80 |
| | | | 455/404.1 |
| 2016/0036754 A1* | 2/2016 | Mese | H04L 51/00 |
| | | | 709/206 |
| 2017/0061310 A1* | 3/2017 | Vahabi | G06F 16/9024 |
| 2017/0124066 A1* | 5/2017 | Tsuchida | G06F 16/353 |
| 2017/0202046 A1* | 7/2017 | Lee | H04L 9/0838 |
| 2017/0332211 A1* | 11/2017 | Uwamori | H04M 3/42 |
| 2018/0012271 A1* | 1/2018 | Chen | G06Q 30/0605 |

FOREIGN PATENT DOCUMENTS

| | | |
|---|---|---|
| CN | 101137133 A | 3/2008 |
| CN | 101488928 A | 7/2009 |
| CN | 105528694 A | 4/2016 |
| CN | 106789571 A | 5/2017 |
| EP | 2835776 A1 | 2/2015 |

OTHER PUBLICATIONS

Translation of Chinese Written Opinion dated Nov. 6, 2018, from corresponding CN PCT Application No. PCT/CN2018/100648, 3 pages.
Translation of CN Office Action for corresponding CN Application No. CN 201711089823.6 dated Jul. 23, 2020, a counterpart foreign application for U.S. Appl. No. 16/797,612, 4 pages.
Translation of CN Search Report for corresponding CN Application No. CN 201711089823.6 dated Jul. 14, 2020, a counterpart foreign application for U.S. Appl. No. 16/797,612, 2 pages.

* cited by examiner

DETERMINE, ACCORDING TO RECEIVED TYPE CHANGE INSTRUCTION WITH
RESPECT TO GROUP, TARGET GROUP TYPE OF GROUP
S202

SELECT, ACCORDING TO LIMITING CONDITION FOR GROUP AFFILIATION
INFORMATION OF GROUP MEMBER IMPOSED BY TARGET GROUP TYPE,
GROUP MEMBER WITHIN GROUP NOT SATISFYING LIMITING CONDITION
S204

REMOVE SELECTED GROUP MEMBER FROM GROUP
S206

FIG. 2

ACQUIRE CREATING REQUEST INITIATED BY CREATING SIDE WITH REGARD
TO COOPERATIVE GROUP
S302

ACCORDING TO GROUP MEMBERS SELECTED BY CREATING SIDE FOR
COOPERATIVE GROUP, DISPLAY TO CREATING SIDE GROUPS TO WHICH
GROUP MEMBERS BELONG, DISPLAYED GROUPS SERVING AS ALTERNATIVE
GROUPS
S304

CONFIGURE PLURALITY OF ALTERNATIVE GROUPS SELECTED BY CREATING
SIDE AS RELATED GROUPS OF COOPERATIVE GROUP, SO AS TO LIMIT
GROUP AFFILIATION INFORMATION OF GROUP MEMBERS IN COOPERATIVE
GROUP WITHIN RELATED GROUPS
S306

FIG. 3

METHOD FOR CHANGING GROUP TYPE AND GROUP CREATION METHOD AND DEVICE

CROSS REFERENCE TO RELATED PATENT APPLICATIONS

This application claims priority to and is a continuation of PCT Patent Application No. PCT/CN2018/100648, filed on 15 Aug. 2018 and entitled "METHOD FOR CHANGING GROUP TYPE AND GROUP CREATION METHOD AND DEVICE," which claims priority to Chinese Patent Application Nos. 201710735258.X filed on 24 Aug. 2017 and entitled "Method for Changing Group Type and Group Creation Method and Device," and Chinese Patent Application Nos. 201711089823.6, filed on 8 Nov. 2017 and entitled "Method for Changing Group Type and Group Creation Method and Device," all of which are incorporated herein by reference in their entirety.

TECHNICAL FIELD

One or more example embodiments in the present disclosure relate to the field of terminal technology, and, more particularly, to a method for changing a group type and a group creation method and device.

BACKGROUND

In conventional techniques, mobile group office platforms are being more and more extensively applied in the processes of enterprises, educational institutions, government agencies, and various other types of group office. Such applications may enhance not only the efficiency of communication among users and lower communication costs, event processing efficiency and office efficiency of users may also be enhanced effectively. For example, mobile group office platforms may create groups and add multiple users to a single group to achieve convenient communication among group members in the group.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

In view of the above, one or more example embodiments of the present disclosure provide a method for changing a group type and a group creation method and device.

To achieve the object set forth above, one or more example embodiments of the present disclosure provide the following technical solutions:

An example embodiment of the present disclosure provides a method for changing a group type, comprising:

determining, according to a received type change instruction with respect to a group, a target group type of the group;

selecting, according to a limiting condition on group affiliation information of group members imposed by the target group type, group members within the group not satisfying the limiting condition; and removing the selected group member from the group.

Another example embodiment of the present disclosure provides a method for creating a group, comprising:

acquiring a creating request initiated by a creator with regard to a cooperative group;

according to group members selected by the creator for the cooperative group, displaying to the creator groups to which the group members belong, the displayed groups serving as alternative groups; and configuring a plurality of alternative groups selected by the creator as related groups of the cooperative group, so as to limit group affiliation information of the group members in the cooperative group to the related groups.

Another example embodiment of the present disclosure provides a device for changing a group type, comprising:

a determining unit that, according to a received type change instruction with respect to a group, determines a target group type of the group;

a selecting unit that, according to a limiting condition for group affiliation information of group members imposed by the target group type, selects group members within the group not satisfying the limiting condition; and a removing unit that removes the selected group members from the group.

Another example embodiment of the present disclosure provides a device for creating a group, comprising a request acquiring unit that acquires a creating request initiated by a creator with regard to a cooperative group;

a display unit that, according to group members selected by the creator for the cooperative group, displays to the creator groups to which the group members belong, the displayed groups serving as alternative groups; and a configuring unit that configures a plurality of alternative groups selected by the creator as related groups of the cooperative group, so as to limit group affiliation information of the group members in the cooperative group to the related groups.

For example, in conventional techniques, there is no easy way to remove multiple users or friends from a group in an instant messaging application, which has to be removed one by one manually. In the modern world, however, it is very common for cooperation among different enterprises (such as companies, offices, and branches). There can be hundreds or thousands of users from different enterprises in one group. If all of the users from one enterprise need to be removed from the group, it may be in fact impossible to remove such users one by one manually for hundreds or thousands of users. Furthermore, time may be of the essence in such a situation. Once an enterprise is not qualified to remain in the group, all users of such enterprise need to be removed from the group immediately at the same time to avoid data sharing or leaking. It is apparent that is likely impossible to remove multiple users from the group at the same time manually.

Thus, a technical challenge remains to quickly and efficiently configure users or friends of the group to easily manage users from multiple enterprises. For example, the techniques of the present disclosure use clouding computing technology to quickly and efficiently manage or configure multiple users from the same enterprise in the group, thereby ensuring removing multiple users from the same enterprise by a simple operation such as a click at the same time.

BRIEF DESCRIPTION OF THE DRAWINGS

Through the detailed description of example embodiments below, various technical advantages and benefits of the present disclosure will become apparent to those skilled in the art. The drawings are only provided for the purpose of illustrating the example embodiments and are not to be construed as limiting. Throughout the drawings, the same reference numerals are used to refer to the same parts. In the drawing:

FIG. 2 is a flowchart of a method for changing a group type provided in an example embodiment.

FIG. 3 is a flowchart of a method for creating a group provided in an example embodiment.

DETAILED DESCRIPTION

Example embodiments will be described in detail herein. The examples are illustrated by the drawings. When the description below involves a drawing, unless otherwise indicated, identical numbers in different drawings represent identical or similar elements. The implementation modes described in the example embodiments below do not represent all implementation modes of one or more example embodiments of the present disclosure. On the contrary, they are merely examples of devices and methods consistent with certain aspects of one or more example embodiments of the present disclosure and as described in detail in the attached claims.

Figure 1:
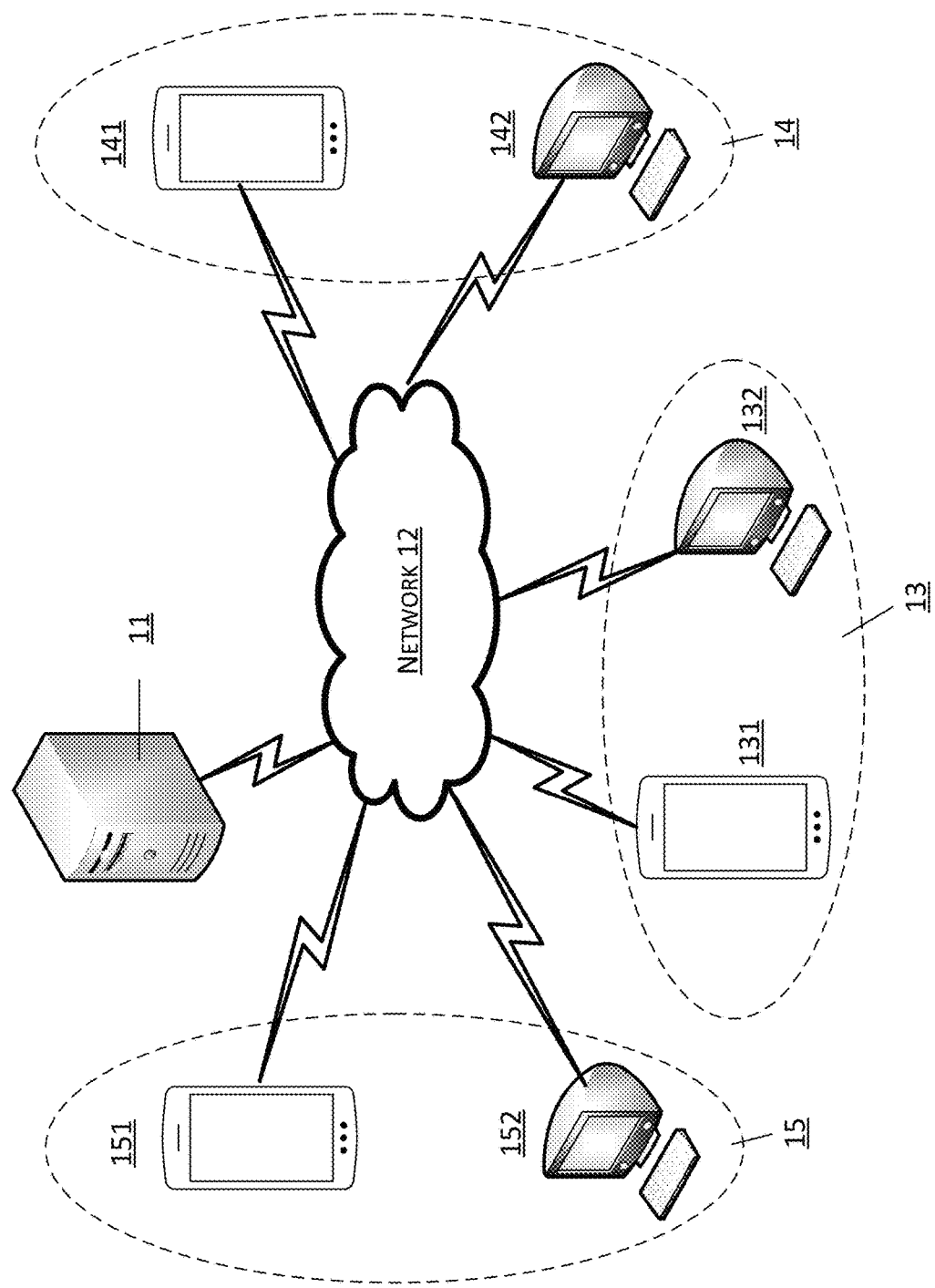
FIG. 1 is a structural schematic diagram of a group management system provided in an example embodiment.

FIG. 1 is a structural schematic diagram of a group management system provided in an example embodiment. As shown in FIG. 1, the system may comprise a server 11, a network 12, an electronic device 13, an electronic device 14, an electronic device 15, and the like.

The server 11 may be a physical server comprising an independent host. Alternatively, the server 11 may be a virtual server carried on a host cluster, or the server 11 may be a cloud server. In the operating process, the server 11 may run a server-side program of a certain application to achieve the related business functions of the application. For example, when the server 11 runs a program of a mobile group office platform, it may be implemented as the server of the mobile group office platform to achieve group management functions, such as changing group types and creating groups.

The mobile group office platform is not only capable in implementing communication functions, it also serves as an integrated function platform for various other functions, such as processing of internal events like approval events (such as vacation requests, office supplies requisitioning, and financial approval events), attendance events, task events, daily record events, etc. Further examples are processing for external events like restaurant reservations and purchasing, etc. One or more example embodiments of the present disclosure do not impose limitations in this regard. More specifically, the mobile group office platform may be carried onto instant messaging applications of a related technology, such as a business instant messaging (Enterprise Instant Messaging, EIM) application. Examples of such include Skype for Business®, Microsoft Teams®, Yammer Workplace®, Slack®, Enterprise WeChat®, FXiaoke®, Enterprise Fetion®, and Enterprise Yixin®. Certainly, the instant messaging function is merely one of the communication functions supported by the mobile group office platform. The mobile group office platform may also achieve other functions such as those mentioned above, and no further elaboration will be provided herein.

In addition to mobile phones (such as a mobile phone 131, a mobile phone 141, and a mobile phone 151) and PCs (such as a PC 132, a PC 142, and a PC 152), and the like, electronic devices 13 to 15 may further comprise various other types of devices, such as tablet devices, notebook computers, personal digital assistants (PDAs), and wearable devices (such as smart glasses and smart watches). One or more example embodiments in the present disclosure impose no limitations in this regard. In the operation process, the electronic device may run the client-side programs of a certain application to achieve the related business functions of that application. For example, when the electronic device runs the program of the mobile group office platform, it may be implemented as the client of the mobile group office platform to automatically achieve the technical solutions of the present disclosure or by responding to a user's operation.

In this process, the application program of the client of the mobile group office platform may be installed in advance on the electronic devices 13 to 15 so that the client may be activated and run on the electronic devices 13 to 15. Certainly, when using various on-line "clients" such as HTML5 technology, it is possible to acquire and run the client without having to install corresponding application programs on the electronic devices 13 to 15.

With regard to the network 12 that achieves interaction between the electronic devices 13 to 15 and the server 11, it may comprise various types of wired and wireless networks. In an example embodiment, the network 12 may comprise a public switched telephone network (PSTN) and the Internet. At the same time, communication interaction among electronic devices 13 to 15 may be achieved using the network 12. For example, a single chat communication session may be established between any two electronic devices. Alternatively, electronic devices 13 to 15 may participate in a communication session corresponding to a single group, allowing any user to use his own electronic device to transmit communication messages to other group members in the communication session. The technical solution of the present disclosure may be used to create the group or change the type of the group.

FIG. 2 is a flowchart of a method for changing a group type provided in an example embodiment. As shown in FIG. 2, the method is applied to servers (such as the server 11 shown in FIG. 1) or user devices (such as the electronic devices 13 to 15 shown in FIG. 1), and may comprise the following steps:

Step 202: determining, according to a received type change instruction with respect to a group, a target group type of the group.

In an example embodiment, the type change instruction is used to change an original group type of the group to other group type among alternative group types. For example, the original group type may be any group type among the alternative group types; and the original group type may be changed to some other group type among the alternative group types.

In an example embodiment, the alternative group types may comprise any one of the following: a common group, wherein the common group imposes no limitations on the group affiliation information of group members; a cooperative group, wherein the cooperative group limit the group affiliation information of group members to a plurality of set related groups; an internal group, wherein the internal group limiting the group affiliation information of group members to a set internal group; and an industry group, wherein the industry group limiting the group affiliation information of group members to one or more set industry types. Certainly, the present disclosure imposes no limitations in this regard.

In an example embodiment, a type change prompt message may be transmitted to an administrative member of the group; after which, according to an operation made by the administrative member in response to the type change prompt message, the type change instruction returned by the administrative member may be received. The type change prompt message may be issued in response to a prompt instruction issued by a specific target. For example, the specific targets may comprise a server-side or user-side manager or the like. Alternatively, the type change prompt message may be automatically transmitted. For example, by means of the acquisition of group affiliation information of group members in the group and when the group affiliation information of at least some of the group members satisfies a limiting condition for the group affiliation information of group members imposed by any alternative group type, a type change prompt message relating to the any alternative group type may be transmitted to the administrative member of the group.

Step 204: selecting, according to a limiting condition for the group affiliation information of a group member imposed by the target group type, a group member within the group not satisfying the limiting condition.

In an example embodiment, when the limiting condition corresponding to the target group type limits the group affiliation information of the group members to a set group, the group needed to be set may be confirmed with the administrative member of the group. Subsequently, according to a confirmation result returned by the administrative member, group members having group affiliation information unrelated to a group set by the administrative member may be selected. Administrative members may comprise a group member having a privilege to manage the group, such as a group host (i.e., the one who creates the group), an administrator (a group member with administrative authority offered by the group host), or the like. Alternatively, the administrative members may include users outside the group, such as a super administrator or the like for all groups. The present disclosure imposes no limitations in this regard.

Under one situation, the group set by the administrative member may comprise: at least one internal group to which the administrative member belongs. Accordingly, the target group types may comprise an internal group to enable communication within the group among group members of the internal group.

Under another situation, the group set by the administrative member may comprise: at least one internal group to which the administrative member belongs, and at least one external group to which other group members of the group belong, wherein the administrative member does not belong to the external group. Accordingly, the target group types may comprise a cooperative group to enable cross-group communication between group members of the internal group and those of the external group.

Step 206: removing the selected group members from the group.

In an example embodiment, when the target group type results in the group affiliation information among group members in the group not completely identical, a privilege to mutually browse group affiliation information may be granted to group members in the group, so as to facilitate the understanding of the group affiliation information of one another among group members. As a result, group members may quickly find those that interest them, understand the communication intent of others, and the like, thereby enhancing communication efficiency.

In an example embodiment, group members may open a group management interface corresponding to the group to view the group affiliation information of each group members.

In an example embodiment, group members may view each other's personal information. This personal information may comprise the group affiliation information of the corresponding group member.

In an example embodiment, when any one group member transmits a group message based on a communication session corresponding to the group, the group message is displayed on a communication session interface corresponding to the communication session, and the group affiliation information of the any one group member is further shown in a related display region corresponding to the group message on the communication session interface. As a result, in a normal group communication process, group members may rapidly learn the group affiliation information of the other side without having to manually switch between interfaces.

FIG. 3 is a flowchart of a method for creating a group provided in an example embodiment. As shown in FIG. 3, this method is applied onto a server (such as the server 11 shown in FIG. 1) or a user device (such as the electronic devices 13 to 15 shown in FIG. 1), and the method may comprise the following steps:

Step 302: acquiring a creating request initiated by a creator with regard to a cooperative group.

In an example embodiment, the creator may comprise any users, such as an administrator or a common user of the group to which the creator belongs. The present disclosure imposes no limitations in this regard.

Step 304: according to group members selected by the creator for the cooperative group, displaying to the creator groups to which the group members belong, the displayed groups serving as alternative groups.

Step 306: configuring a plurality of alternative groups selected by the creator as related groups of the cooperative group, so as to limit group affiliation information of the group members in the cooperative group within the related groups.

In an example embodiment, a cooperative group is created to allow more convenient cross-group communication between group members of different groups and enhance communication efficiency. At the same time, configuring related groups by using a cooperative group limits group member to be within the related groups, thereby preventing group members from other groups from joining and preventing the leakage of communication contents.

To facilitate the understanding, an example of the EIM will be adopted to describe the technical solution of the present disclosure. In the example of FIG. 1, assuming that an EIM server is running on the server 11, that a user A belongs to an Enterprise AA, and that an EIM client 1 is running on the mobile phone 131 used by the user A; assuming that a user B belongs to the Enterprise AA, and that an EIM client 2 is running on the mobile phone 141 used by the user B; and assuming that a user C belongs to an Enterprise BB, and that an EIM client 3 is running on the mobile phone 151 used by the user C. Then, the user A may create a cooperative group between the Enterprise AA and the Enterprise BB or change the type of a created through the coordination between the EIM client 1 and the EIM server.

Figure 4:
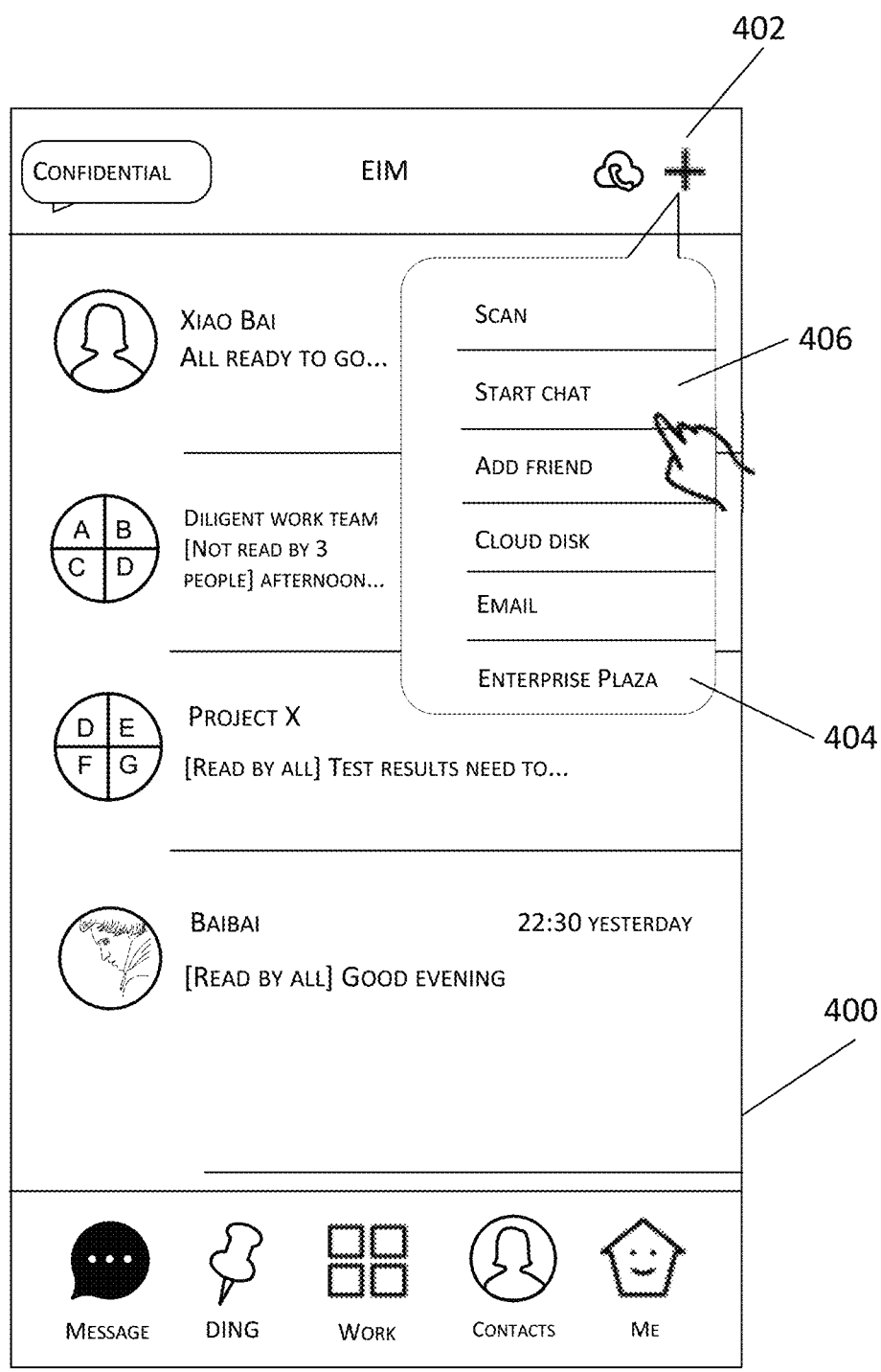
FIG. 4 is a schematic diagram of an interface for triggering a creation of a group provided in an example embodiment.

FIG. 4 is a schematic diagram of an interface for triggering the creation of a group provided in an example embodiment. As shown in FIG. 4, the user A may trigger a menu access 402 on the communication session list interface 400 provided by the EIM client 1 to call a corresponding menu interface 404. The menu interface 404 comprises function options corresponding to certain functions provided by the EIM client 1. These function options may comprise a "Launch a group chat" option 406. This "Launch a group chat" option 406 is used to trigger a group creation process.

In another example embodiment, other methods may be used to trigger a group creation process, and triggering "Launch a group chat" option 406 set forth above may not be necessary. The present disclosure imposes no limitations in this regard.

Figure 5:
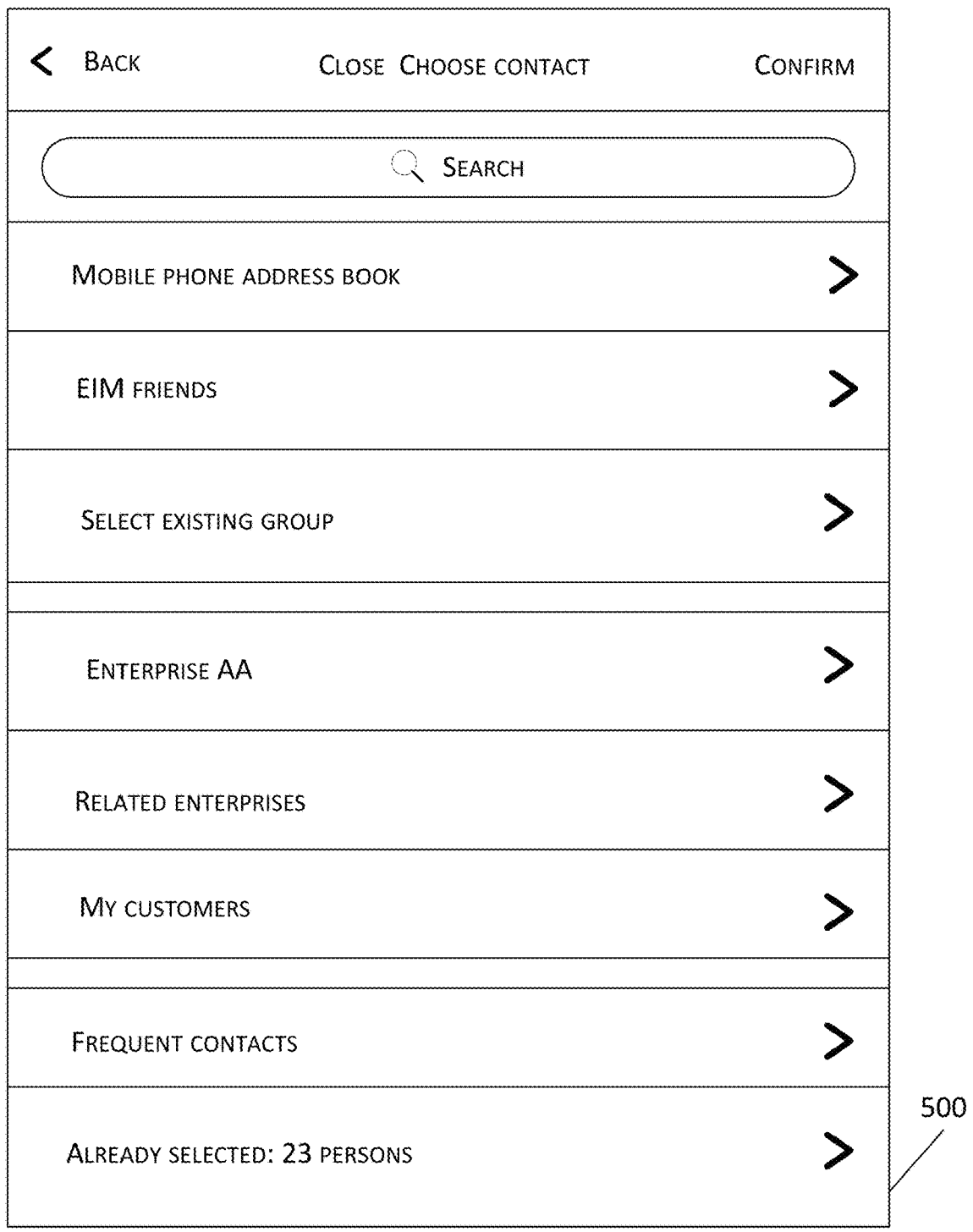
FIG. 5 is a schematic diagram of an interface for selecting group members provided in an example embodiment.

FIG. 5 is a schematic diagram of an interface for selecting group members provided in an example embodiment. When the triggering of a group creating process by the user A is detected, a contact selection interface 500 such as that shown in FIG. 5 may be displayed on the EIM client 1; the user A may then use the interface to select users that the user A wishes to be included as group members. The user A may add any associated user as a group member. For example, sources of associated users may include the "mobile phone address book (i.e., local contact information recorded by the "address book" application on the mobile phone 131)" shown on the contact selection interface 500; "EIM friends (i.e., contact information recorded on the EIM client 1)"; "Select an existing group (i.e., group members of the groups that user A has already joined)"; "Enterprise AA (i.e., group members of the group to which user A belongs)"; "Related enterprises (i.e., other groups having an associated relationship with the group to which user A belongs; the associated relationships may include, for example, cooperative relations, management relations, inclusive relations, and the like; the present disclosure imposes no limitations in this regard)"; "My customers (i.e., users who are customers of the user A)"; and "Frequent contacts (such as contacts determined based on contacting times, contact frequency, and contact period)". The present disclosure imposes no limitations on the source of "associated users."

Figure 6:
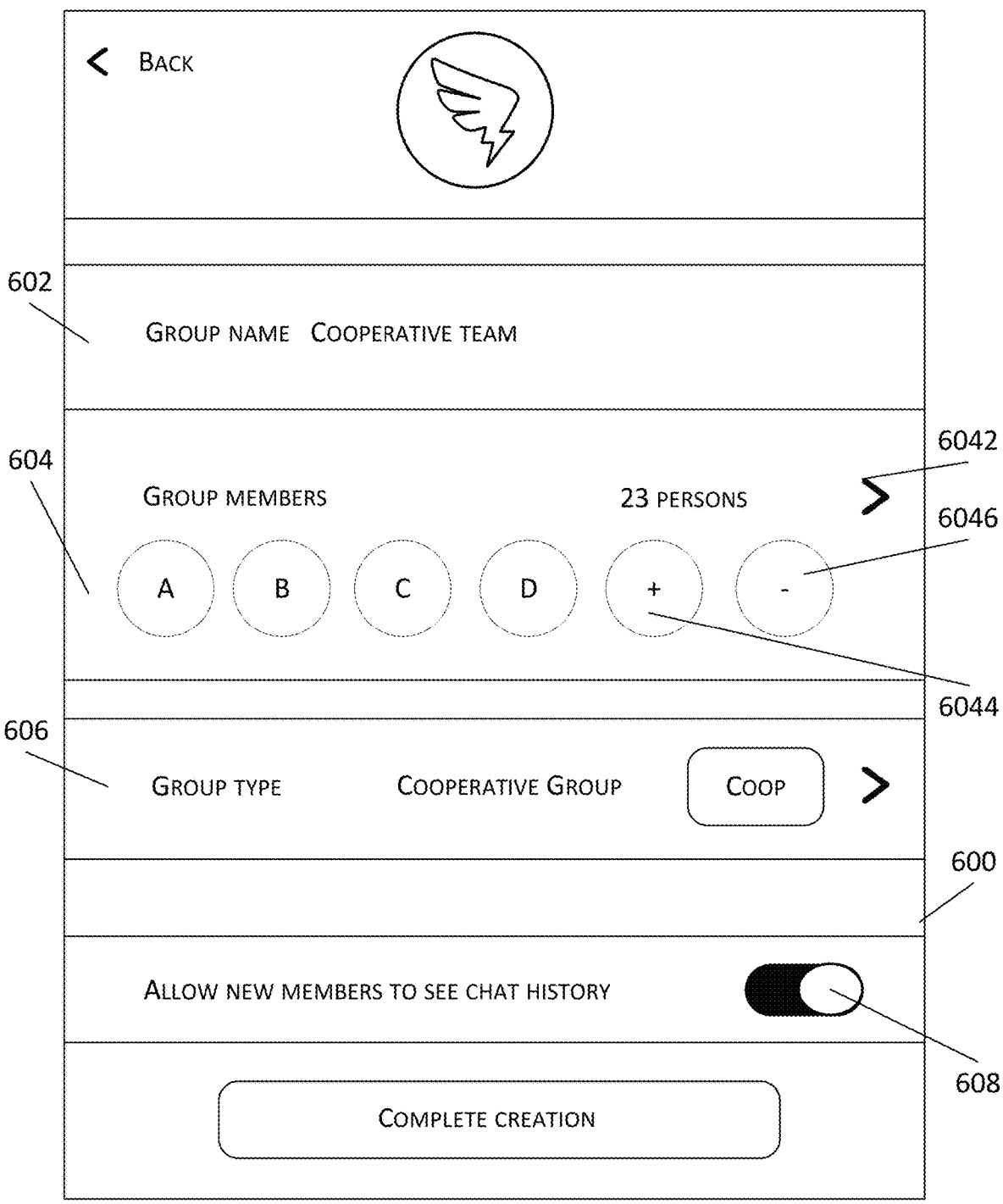
FIG. 6 is a schematic diagram of an interface for configuring group attributes provided in an example embodiment.

FIG. 6 is a schematic diagram of an interface for configuring group attributes provided in an example embodiment. Once the user A has finished selecting group members, the interface may be switched to a group configuration interface 600 as shown in FIG. 6 to configure attributes of the created group. For example, the group configuration interface 600 may comprise a "Group name" option 602 to allow the user A to configure the "Name" attribute of the group. For example, the user A may configure the "Group name" as "Cooperative team." The group configuration interface 600 may comprise a "Group members" option 604, allowing the user A to trigger a view icon 6042 corresponding to the "Group members" option 604 to view group members that have already been selected. The user A may further trigger an add icon 6044 corresponding to the "Group members" option 604 to add more group members and trigger a delete icon 6046 to delete a previously selected group member. The group configuration interface 600 may include a "Group Type" option 606 for the user A to configure the "type" attribute of the group. The group configuration interface 600 may also comprise an "Allow new members to see chat history" option 608. Once the "Allow new members to see chat history" option 608 is activated, newly added group members will be able to see the chat history (i.e., the recorded chat history) of the group, including the chat history occurred before the new group members are added to the group. Such design allows the newly added group member to conveniently understand the history of what has occurred within the group, which in turn facilitates subsequent communication efficiency and event processing efficiency.

Figure 7:
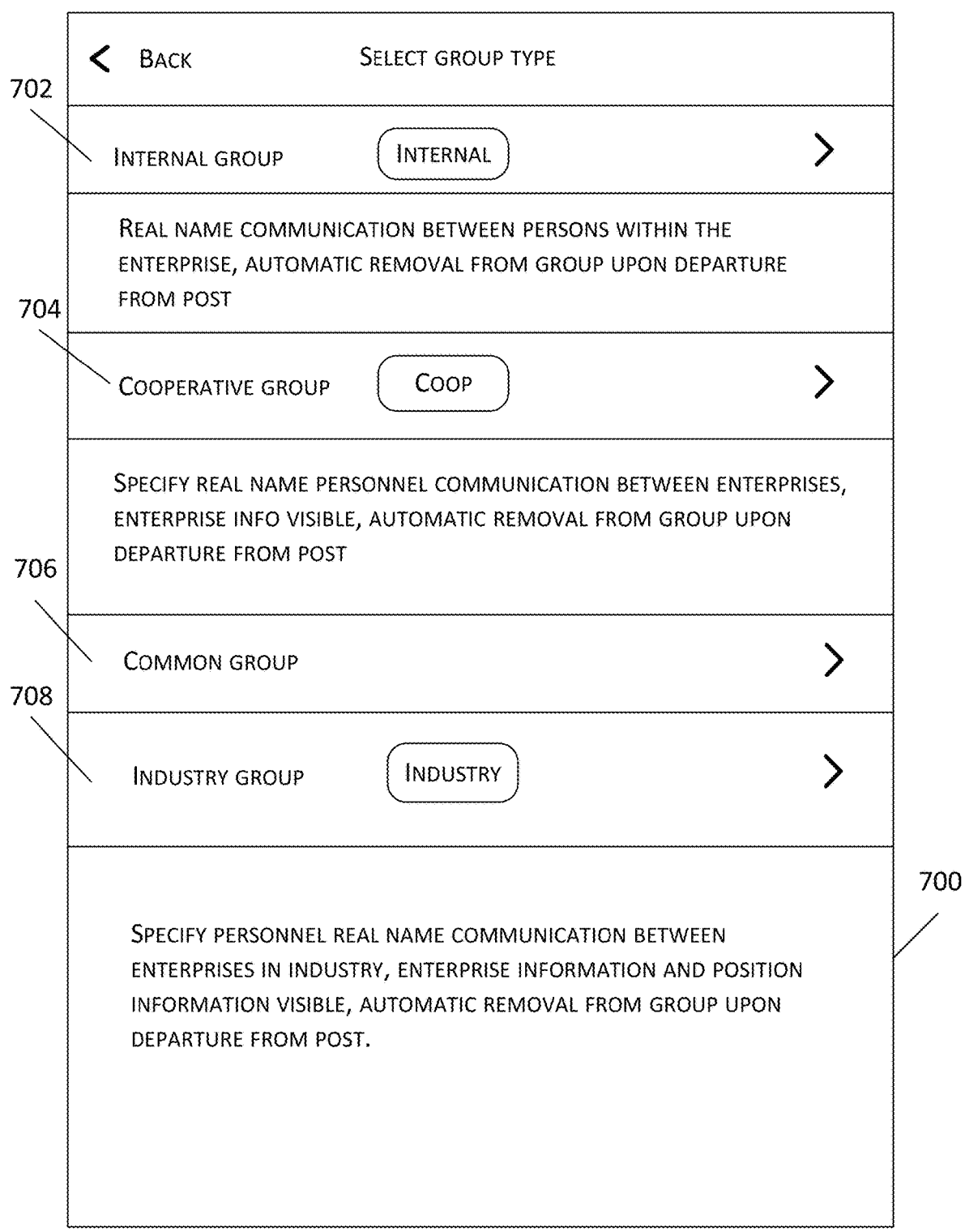
FIG. 7 is a schematic diagram of an interface for selecting group types provided in an example embodiment.

FIG. 7 is a schematic diagram of an interface for selecting group types provided in an example embodiment. Based on the user A's triggering operation regarding "Group type" option 606 above, the interface may be switched to a group type selection interface 700 as shown in FIG. 7, so that the user A may select the group type of "Cooperative team" for the group. In an example embodiment, the alternative group types may include the "Internal group," "Cooperative group," "Common group," "Industry group" and the like shown on the group type selection interface 700. The user A may trigger an "Internal group" option 702 to configure the group "Cooperative team" as an internal group, trigger a "Cooperative group" option 704 to configured the group "Cooperative team" as a cooperative group, trigger a "Common group" option 706 to configure the group "Cooperative team" as a common group, and trigger an "Industry group" option 708 to configure the group "Cooperative team" as an industry group. In other example embodiments, other alternative group types may be provided. The present disclosure imposes no limitations in this regard.

In an example embodiment, different group types impose different limiting conditions on the group affiliation information of group members. For example, the limiting condition for an internal group comprises: the group affiliation information of a group member is limited to a set internal group. The limiting condition for a cooperative group comprises: the group affiliation information of a group member is limited to a plurality of set related groups. The limiting condition for a common group comprises: the group affiliation information of a group member is not limited. In other words, enterprise members within a single enterprise (or school, hospital, agency, or some other group types) may be affiliated with internal groups or common groups; but they generally are not affiliated with cooperative groups. Enterprise members from different enterprises may be affiliated with cooperative groups or common groups, but they should not be affiliated with internal groups.

In an example embodiment, according to the group members determined by the user A through the contact selection interface 500 such as that shown in FIG. 5 and the group affiliation information of individual group members, suitable group types may be recommended automatically. For example, when the group affiliation information of the group members belongs to a plurality of groups, the "Group type" option 606 shown on the group configuration interface 600 such as that in FIG. 6 may be marked as "Cooperative group" automatically. Alternatively, when the group affiliation information of the group members belongs to a single group, "Internal group" may be recommended. The user A may conduct configuration based on the recommended group type or may select other group types through the group type selection interface 700 such as that shown in FIG. 7.

Figure 8:
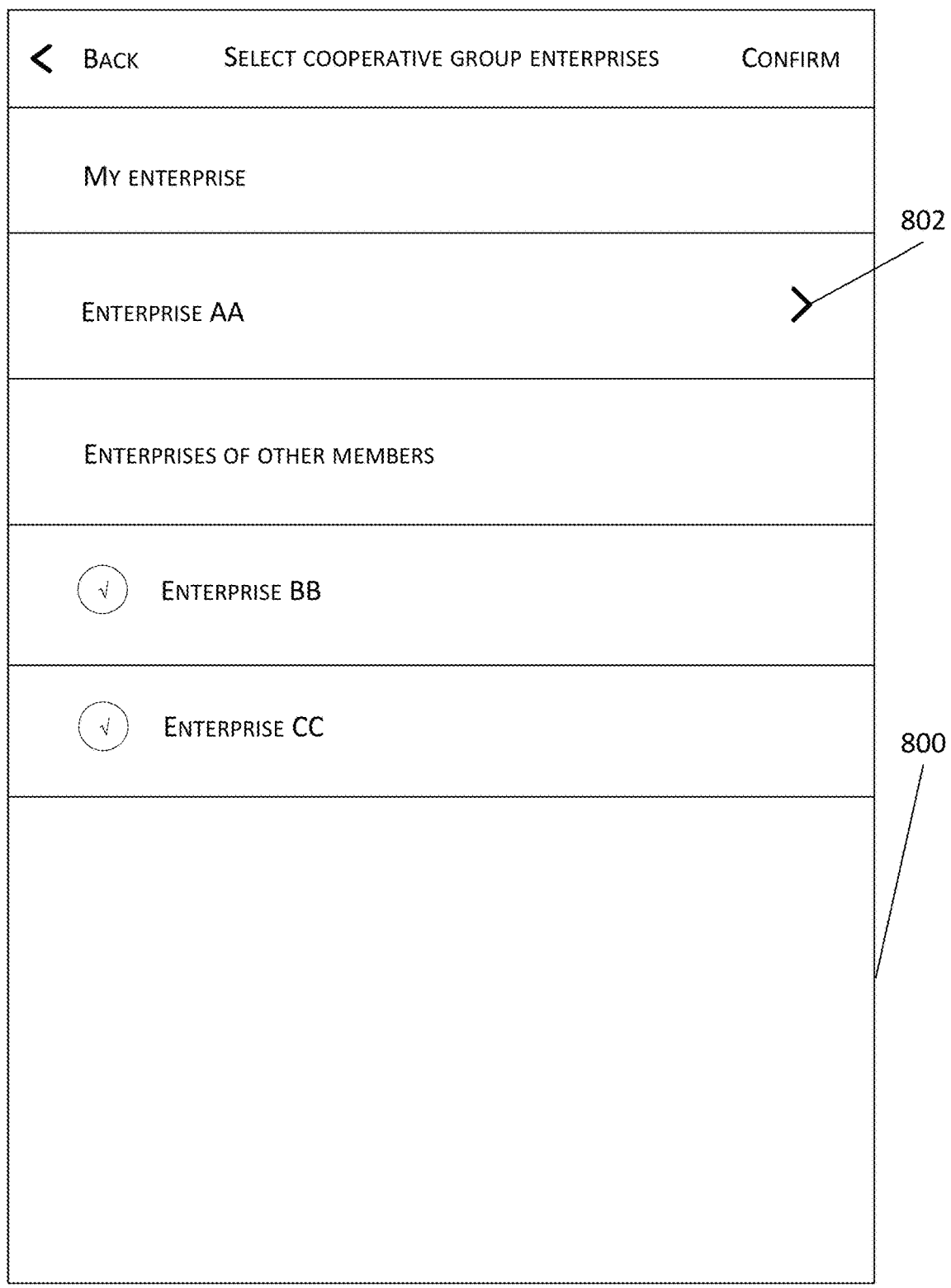
FIG. 8 is a schematic diagram of an interface for selecting enterprises for cooperating group provided in an example embodiment.

FIG. 8 is a schematic diagram of an interface for selecting enterprises for a cooperative group provided in an example embodiment. When the "Cooperative group" is detected as the group type selected by the user A, the EIM client 1 may display to user A a cooperative group enterprise selecting interface 800 such as that shown in FIG. 8 to set groups related to the group "Cooperative team." As shown in FIG. 8, the related groups may comprise internal related groups corresponding to "My enterprise," i.e., groups to which user A belongs such as the "Enterprise AA." The related groups may comprise external related groups corresponding to "Enterprises of other members," i.e., the groups to which other group members of the group "Cooperative team" belong. For example, the "Enterprise BB" to which the user C belongs, and the like may be displayed on the cooperative group enterprise selecting interface 800 for the user A to make a selection.

The user A would need to select at least one internal related group and at least one external related group so that the group members of the group "Cooperative team" come from multiple separate groups, thereby reflecting the cross-group "cooperation" characteristic thereof.

Figure 9:
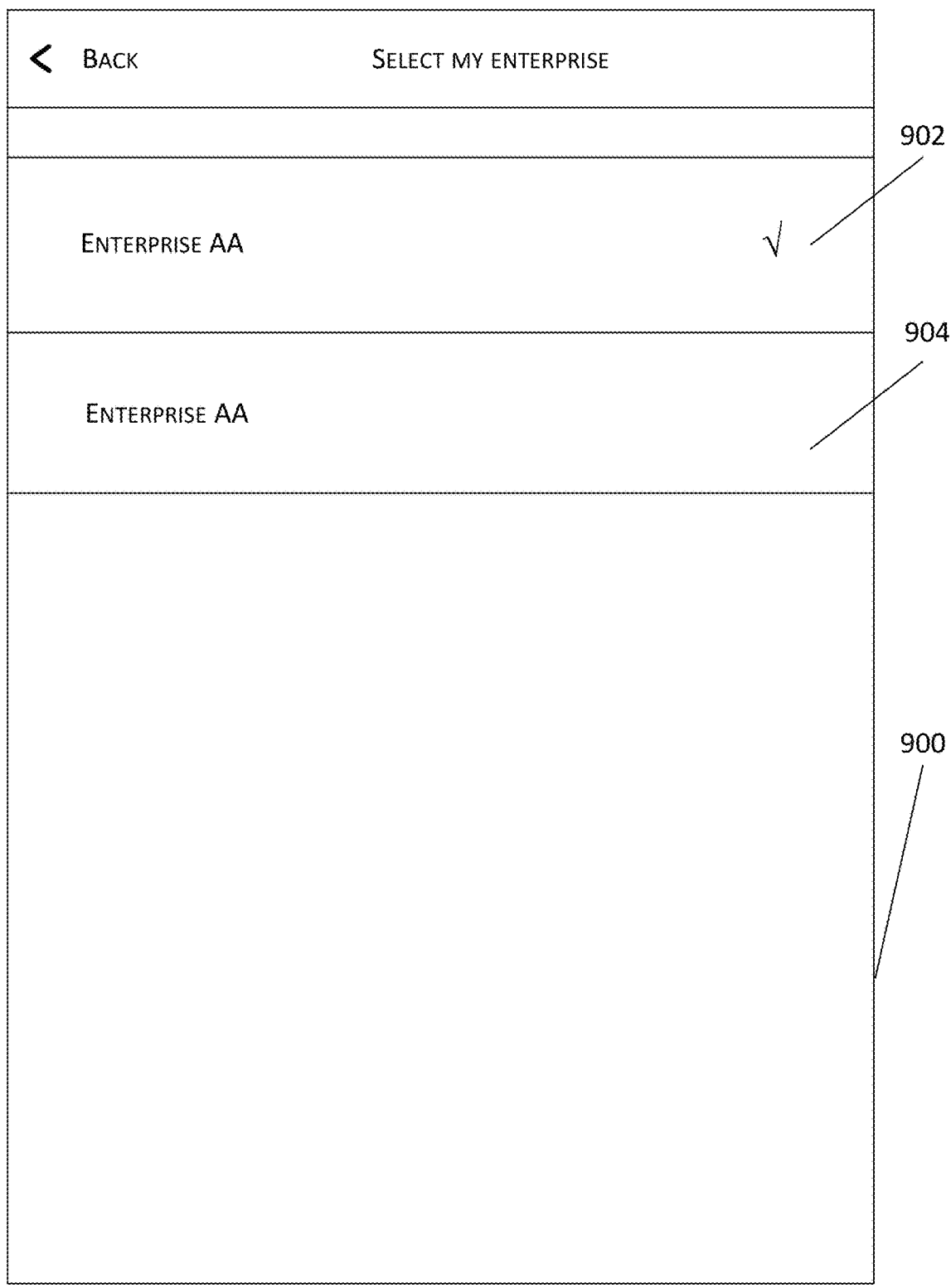
FIG. 9 is a schematic diagram of an interface for selecting internal enterprises provided in an example embodiment.

For an internal related group, if the user A only belongs to the enterprise AA, there is no need to make a selection. If the user A simultaneously belongs to a plurality of groups, the interface may be switched to an internal enterprise selecting interface 900 as shown in FIG. 9 by triggering an icon 802 shown in FIG. 8. Assuming that the user A simultaneously belongs to the enterprise AA and an enterprise AB, an option 902 corresponding to the "Enterprise AA" and an option 904 corresponding to the "Enterprise AB" may be separately shown within the internal enterprise selecting interface 900 to allow the user A to make a selection.

Regarding the external related groups, the user A may trigger an "Enterprise BB" and an "Enterprise CC" on the cooperative group enterprise selecting interface 800 to implement a selection operation. Assuming that the "Enterprise BB" is selected, the ○ option corresponding to the "Enterprise BB" may be configured as " ".

It merits noting that in one or more example embodiments of the present disclosure, "interior" and "exterior" are relative concepts. For example, in the example embodiment set forth above, from the perspective of the user A, the Enterprise AA is considered as belonging to the "internal" group, whereas the Enterprise BB belongs to the "external" group. From the perspective of the user C, the Enterprise BB is considered belonging to the "internal" group, whereas the Enterprise AA belongs to the "external" group.

Figure 10:
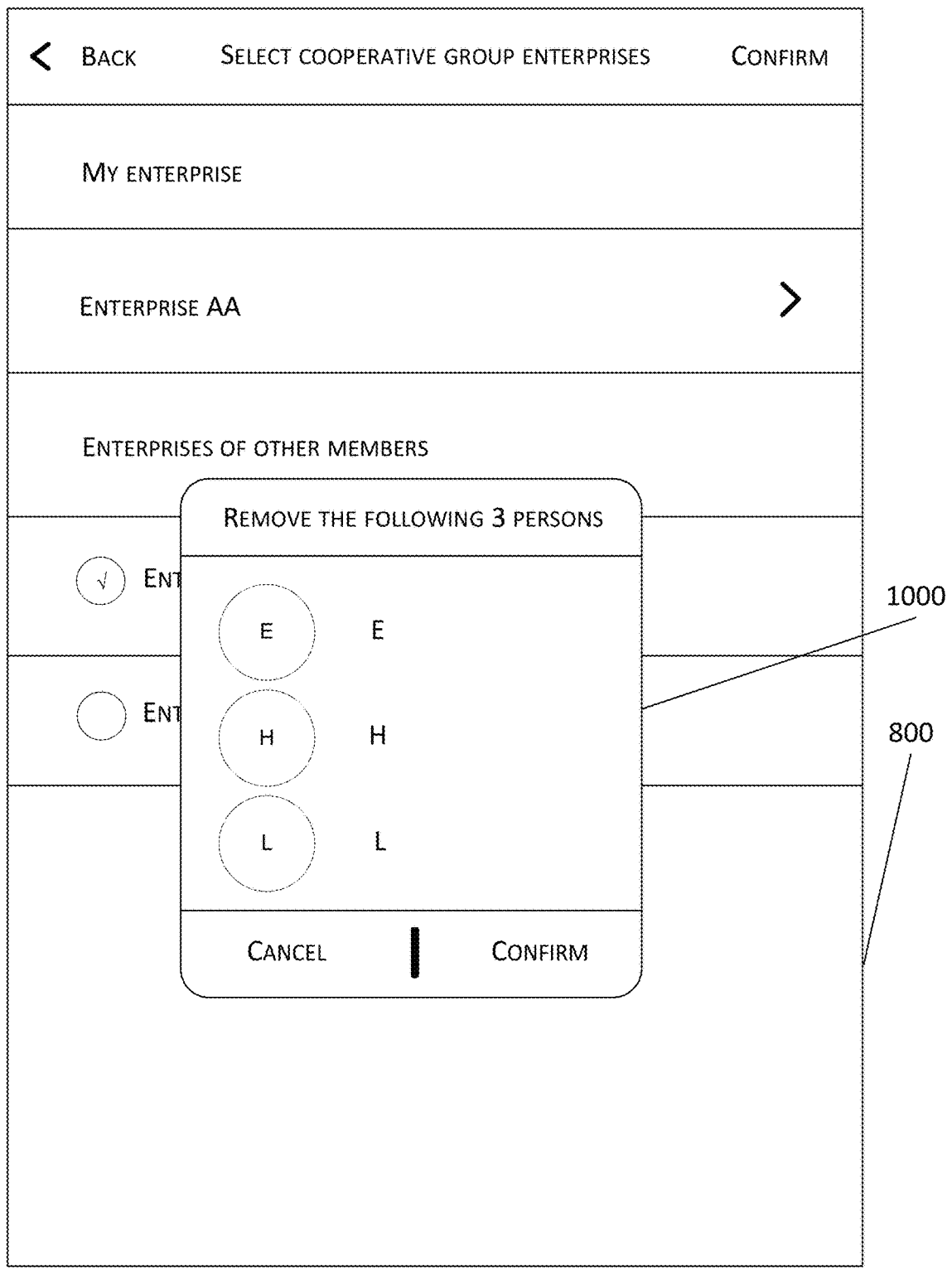
FIG. 10 is a schematic diagram of an interface for automatically removing group members provided in an example embodiment.

FIG. 10 is a schematic diagram of an interface for automatically removing group members provided in an example embodiment. When the method proceeds to the cooperative group enterprise selecting interface 800, all enterprises in "Enterprises of other members" may be selected by default. When it is detected that the user A has triggered the "Enterprise CC," as shown in FIG. 10, the option corresponding to the "Enterprise CC" may be configured as ○, and a corresponding removal prompt interface 1000 may be shown to prompt the user A that: if the "Enterprise CC" is not selected, group members (such as a user E, a user H, and a user L shown in FIG. 10) affiliated with the "Enterprise CC" will be removed from the group "Cooperative team." When it is detected that the user A has selected a "Confirm" option on the removal prompt interface 1000, group members affiliated with the "Enterprise CC" will be automatically removed from the group "Cooperative team," and the group "Cooperative team" will be configured as a "Cooperative group." Further, the group members of this "Cooperative group" will be limited to enterprise members of the Enterprise AA and the Enterprise BB. That is, it will not be possible to add enterprise members from other enterprises as group members of this group "Cooperative team." Additionally, when a group member from the group "Cooperative team" no longer works for the Enterprise AA or the Enterprise BB, the EIM server will be able to learn this dismissing status based on the organizational structure of the Enterprise AA or the Enterprise BB and automatically remove this group member from the group "Cooperative team" to prevent internal information leakage.

Figure 11:
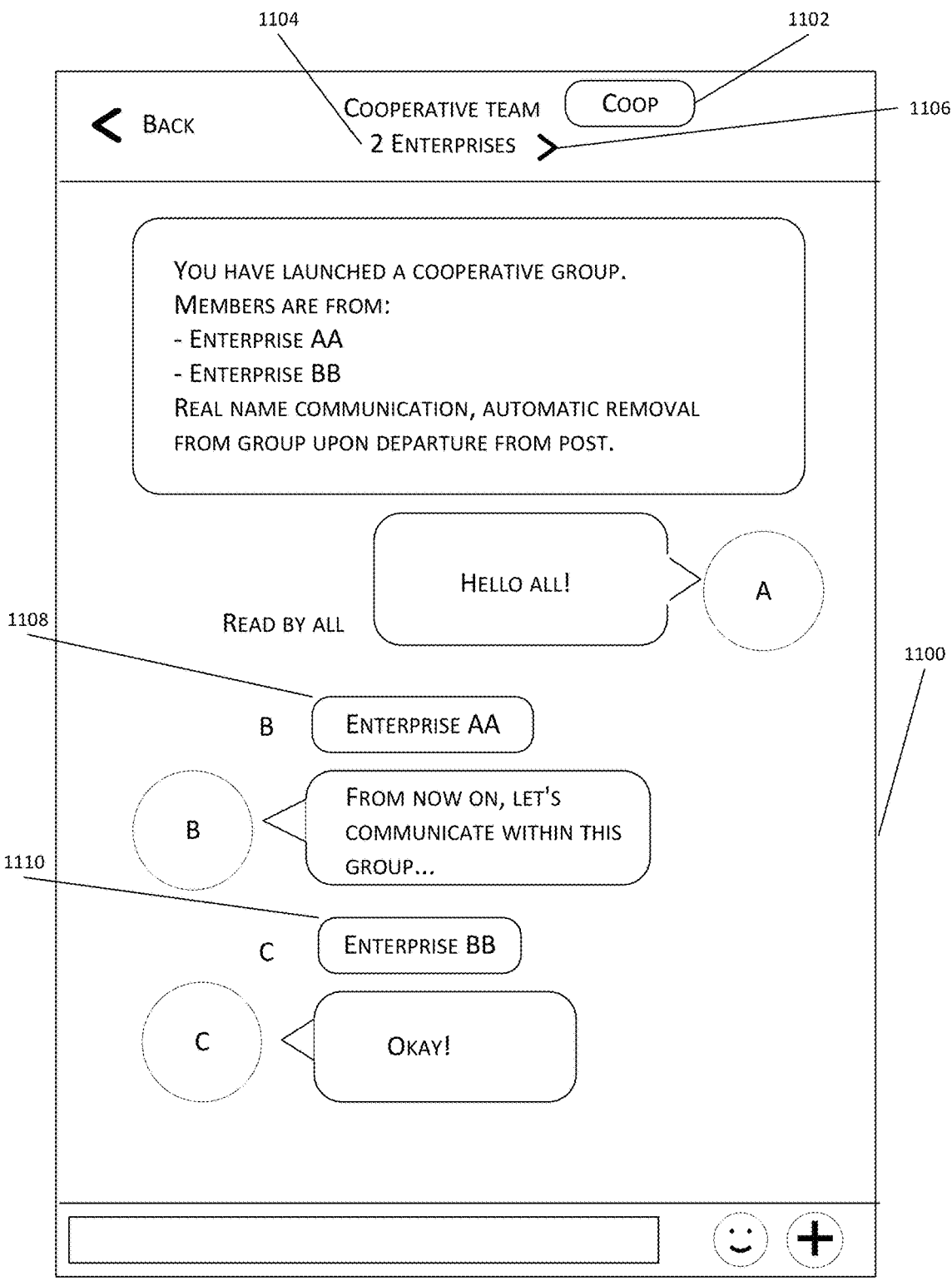
FIG. 11 is a schematic diagram of a cooperative group communication session interface provided in an example embodiment.

FIG. 11 is a schematic diagram of a cooperative group communication session interface provided in an example embodiment. As shown in FIG. 11, in group members the user A, the user B, the user C, and the like may respectively conduct communication using the EIM client 1, the EIM client 2, the EIM client 3, and the like by means of a communication session interface 1100 corresponding to the group "Cooperative team."

In an example embodiment, when the group "Cooperative team" belongs to a cooperative group, the communication session interface 1100 may show tag information 1102 as shown in FIG. 11 to clearly indicate the group type as the "cooperative" type, so that group members may easily distinguish this group from others. Similarly, on the communication session list interface 400 such as that shown in FIG. 4 or other interfaces, the tag information 1102 may be shown within a display region related to the group "Cooperative team," so that group members may easily identify and distinguish this group from others. This is particularly the case when a certain user belongs to many groups simultaneously, this user may be able to rapidly locate the group "Cooperative team" based on the tag information 1102.

Figure 12:
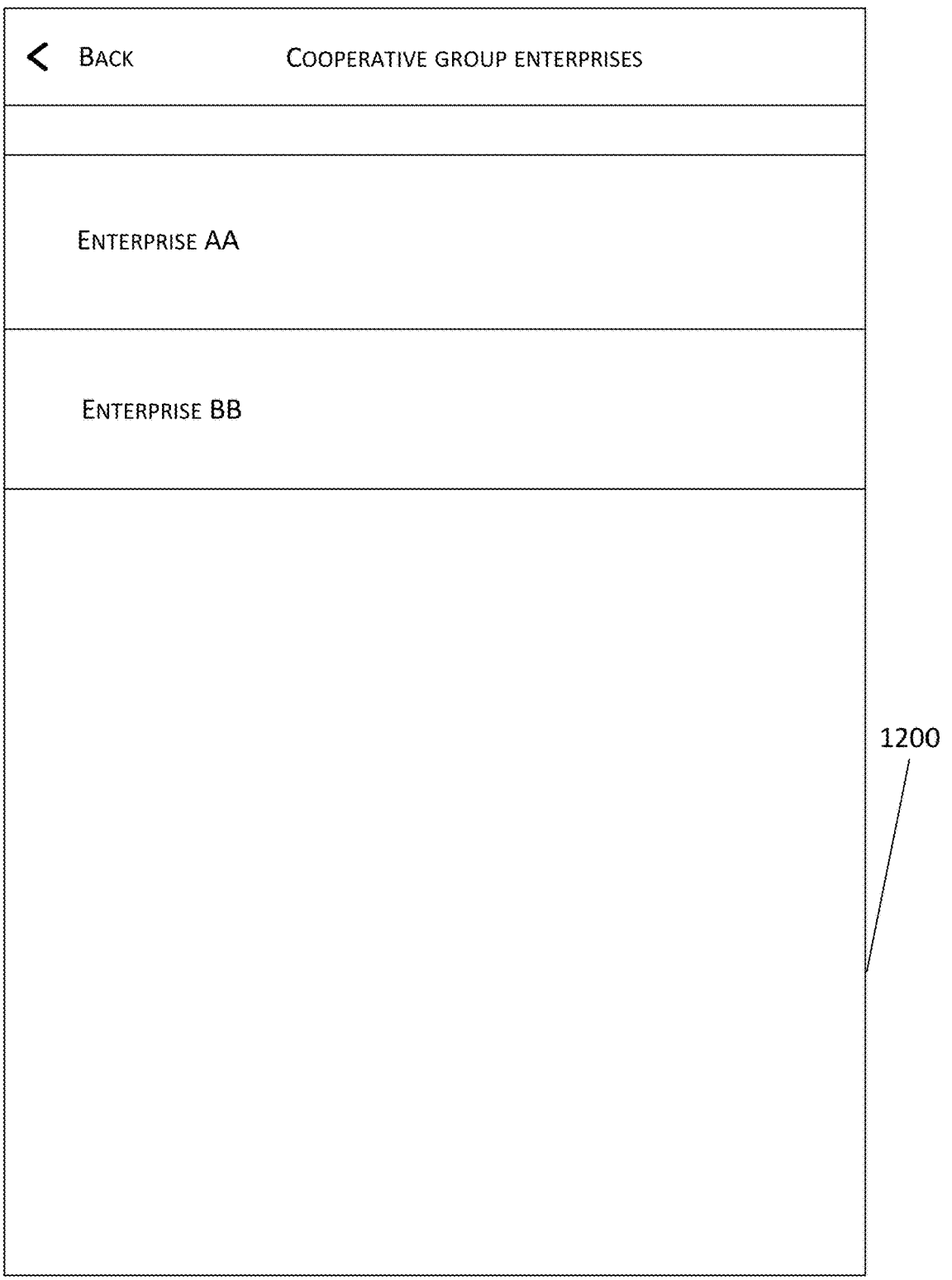
FIG. 12 is a schematic diagram of an interface for displaying cooperative group enterprises provided in an example embodiment.

In an example embodiment, when the group "Cooperative team" belongs to a cooperative group, the enterprise number prompting information 1104 as illustrated in FIG. 11 may be shown on the communication session interface 1100 to clearly indicate that the group "Cooperative team" comprises two set related groups. At the same time, when a triggering operation of icon 1106 is detected, the interface may be switched to a cooperative group enterprises display interface 1200 shown in FIG. 12 to display the two set related groups corresponding to the group "Cooperative team," such as the "Enterprise AA" and the "Enterprise BB" or the like.

In an example embodiment, when the group "Cooperative team" belongs to a cooperative group, the group affiliation information of each group member may be shown on the communication session interface 1100. For example, when the user B belongs to the Enterprise AA and when a communication message is received from the user B, an enterprise tag 1108 illustrated in FIG. 11 may be shown within a display region associated with this communication message. The contents of the enterprise tag 1108 may comprise "Enterprise AA." When the user C belongs to the Enterprise BB and when a communication message is received from the user C, an enterprise tag 1110 illustrated in FIG. 11 may be shown within a display region associated with this communication message. The contents of the enterprise tag 1110 may comprise "Enterprise BB." Additionally, group members may further be able to mutually view group affiliation information by means of other methods, such as viewing the personal information of other group members. The present disclosure imposes no limitations in this regard.

In addition to creating groups, the present disclosure may change group types of groups that have already been created. A change process in combination with example embodiments will be described below.

Figure 13:
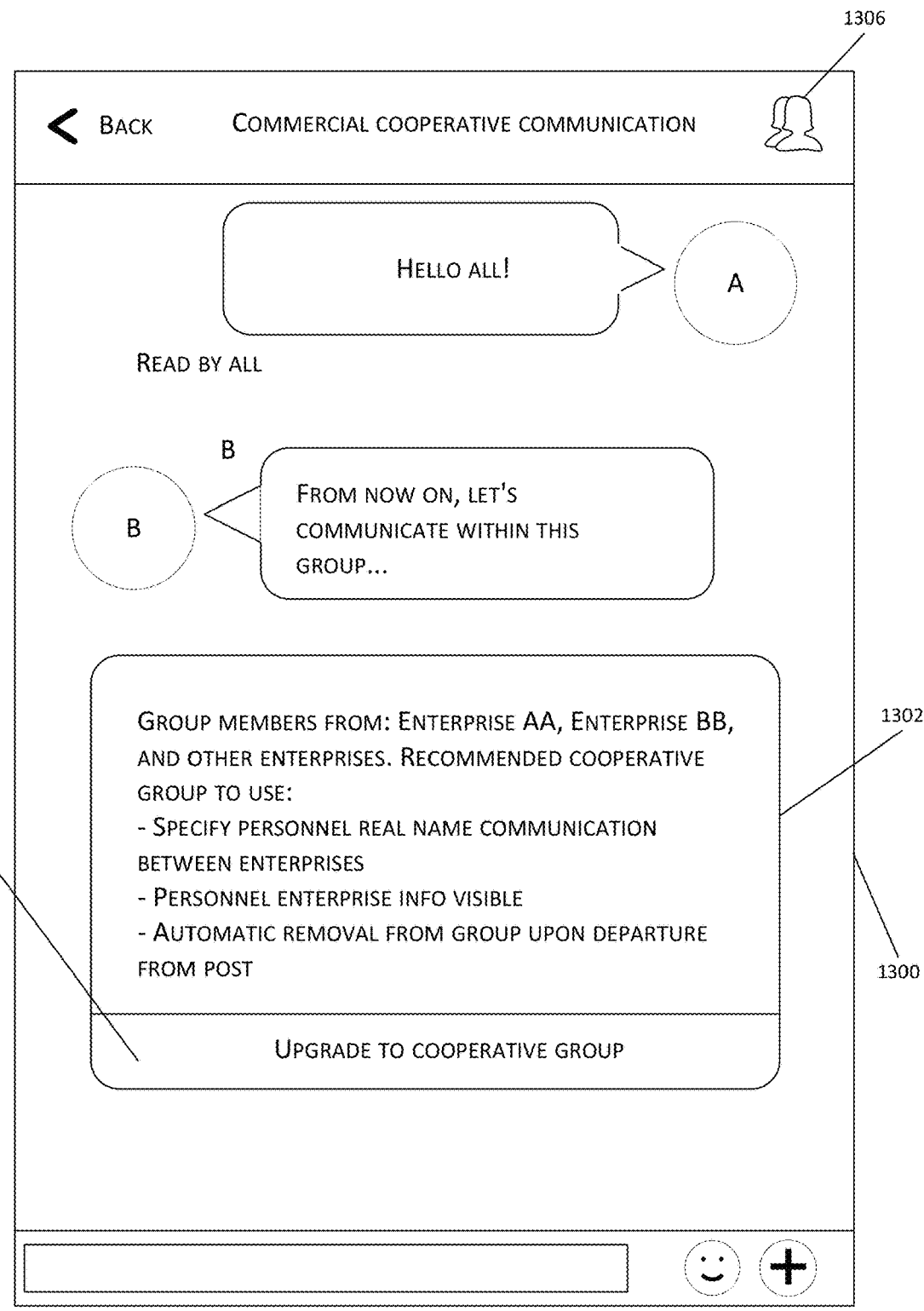
FIG. 13 is a schematic diagram of an interface for recommending an upgrade to a cooperative group provided in an example embodiment.

FIG. 13 is a schematic diagram of an interface for recommending an upgrade to a cooperative group provided in an example embodiment. As shown in FIG. 13, a group "Commercial cooperative communication" created by the user A is used as an example. On a communication session interface 1300 corresponding to the group "Commercial cooperative communication," type change prompt information 1302 may be displayed to the user A to enable the user A to automatically switch the group type to a group type (for example, the group type recommended in FIG. 13 is "Cooperative group") recommended by the type change prompt information 1302 by triggering a corresponding change trigger option 1304. Alternatively, the interface may be switched to the selection group type interface 700 as shown in FIG. 7 for the user A to select and change to a required group type based on actual conditions.

In an example embodiment, the EIM server may automatically push the type change prompt information 1302 as shown in FIG. 13 to the EIM client 1 according to the group members of individual groups and the group affiliation information thereof. For example, when the EIM server discovers that the "Commercial cooperative communication" is a common group, and that its group members come from multiple enterprises such as the Enterprise AA and the Enterprise BB, it may recommend that the group "Commercial cooperative communication" be changed to a cooperative group.

Figure 14:
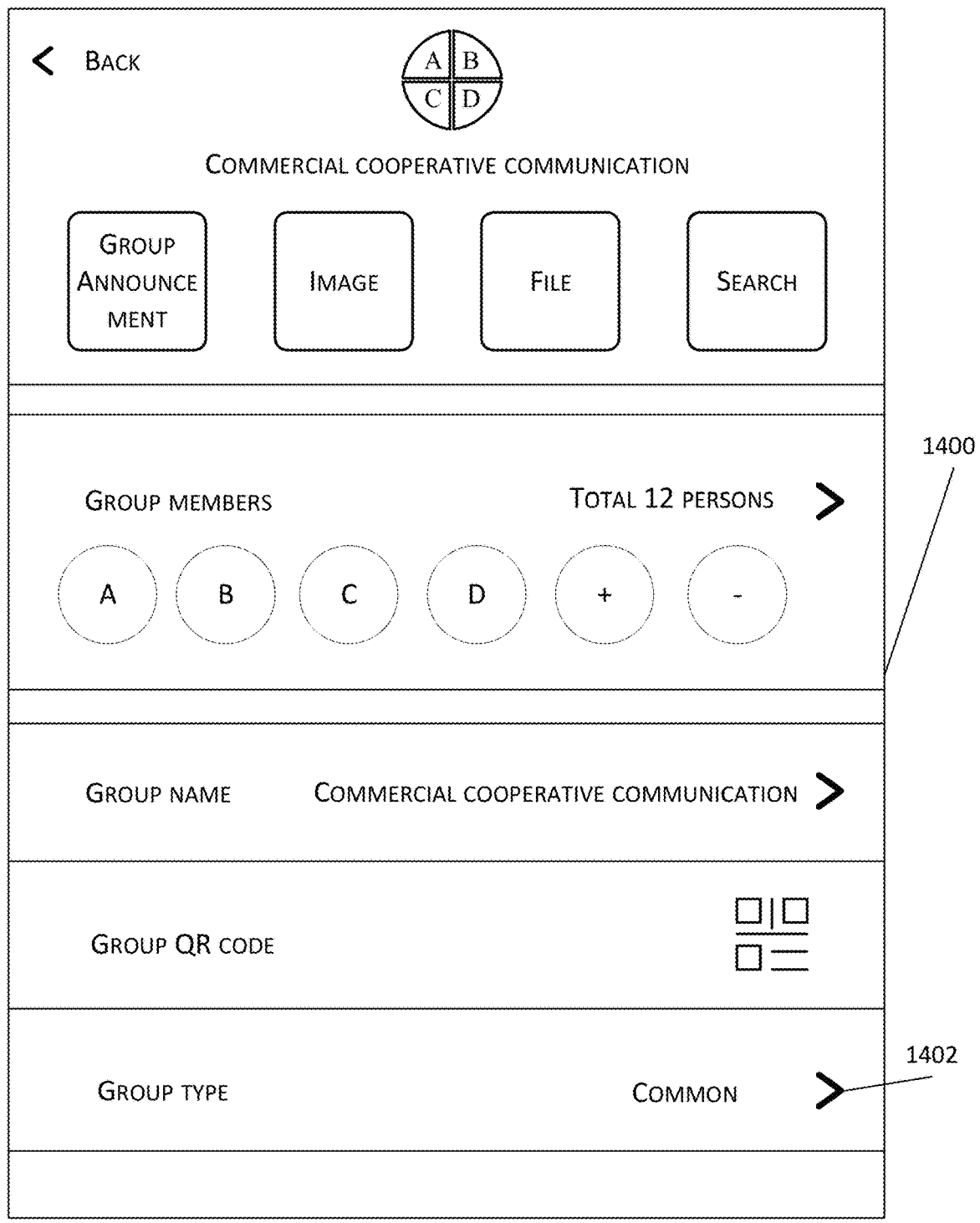
FIG. 14 is a schematic diagram of a group configuration interface provided in an example embodiment.

In an example embodiment, the user A may actively trigger the group type change operation of the group "Commercial cooperative communication." For example, the user A may trigger an interface access 1306 as shown in FIG. 13 to switch the interface to a group configuration interface 1400 shown in FIG. 14, and then further triggers a group type option 1402 contained on the group configuration interface 1400 to switch the interface to the group type selection interface 700 shown in FIG. 7. This allows the user A to select and change to a required group type based on actual conditions.

Figure 15:
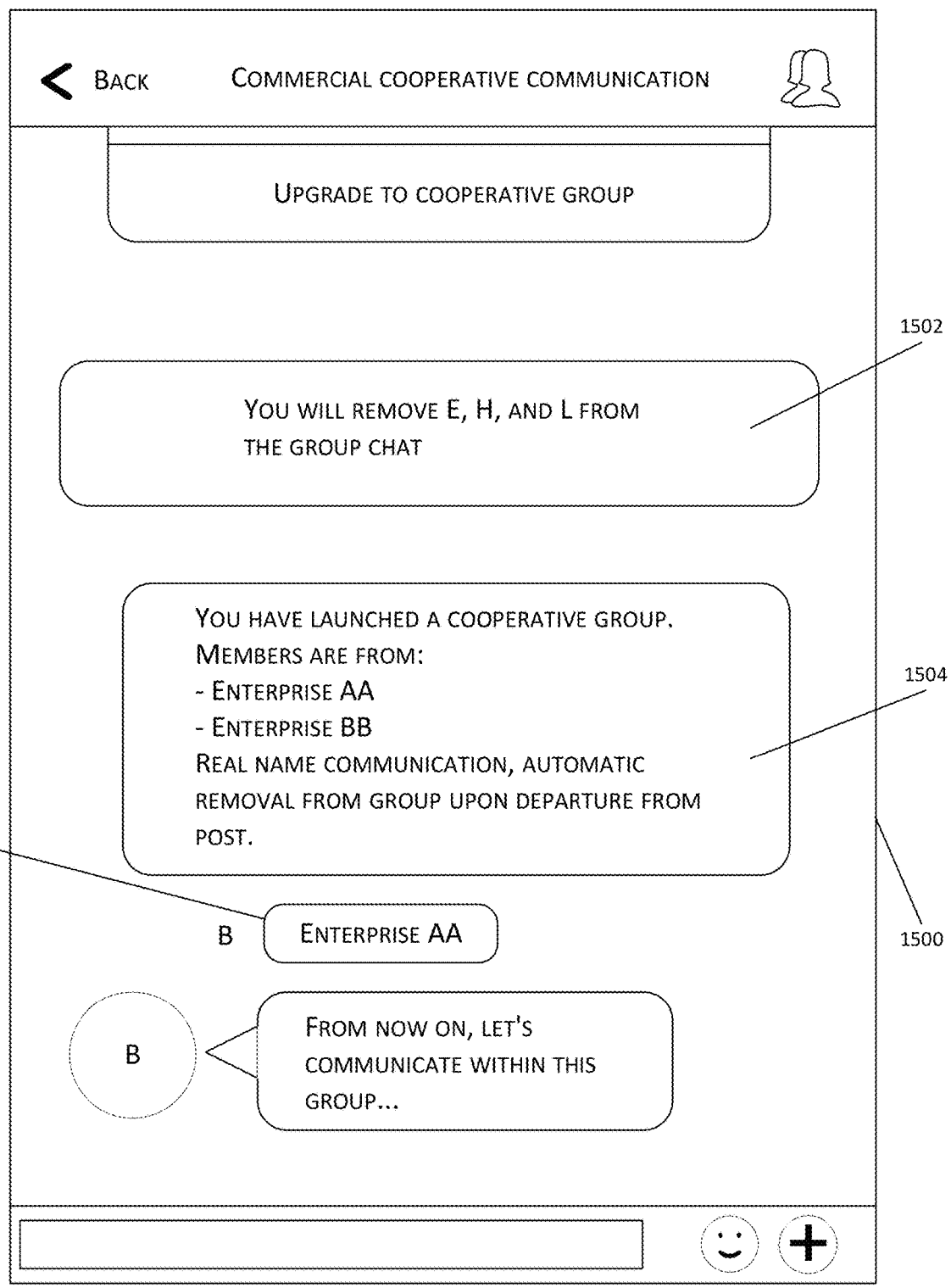
FIG. 15 is a schematic diagram of a communication session interface for a group after being upgraded to a cooperative group provided in an example embodiment.
Figure 16:
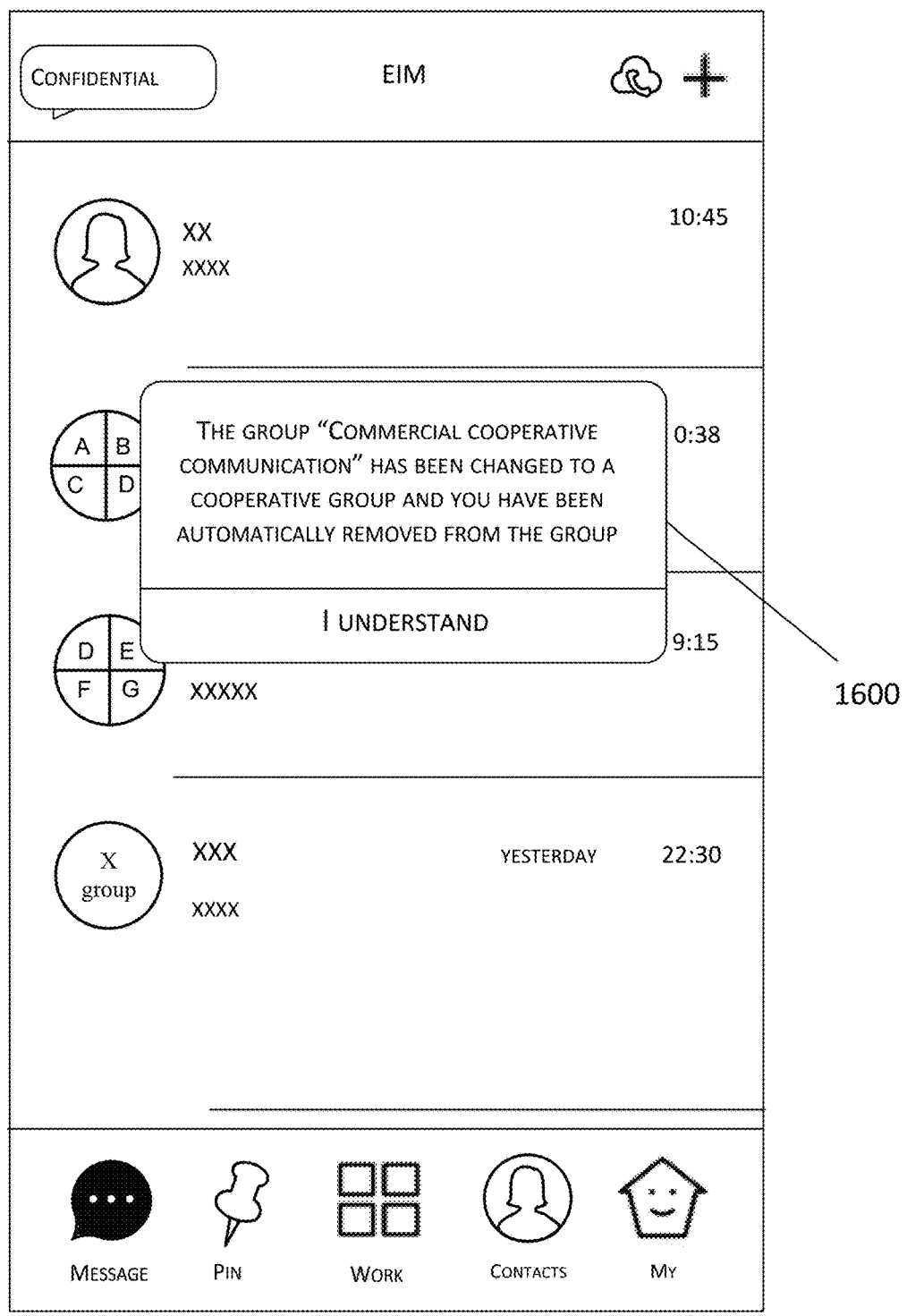
FIG. 16 is a schematic diagram of an interface for notifying that a member is removed from a group provided in an example embodiment.

When the user A wants to change the group "Commercial cooperative communication" from a common group to a cooperative group, since the corresponding limiting conditions undergo change, the user A must use the cooperative enterprise selecting interface 800 as shown in FIG. 8 to set a corresponding internal related group and an external related group for the group "Commercial cooperative communication." For example, assuming that the group members of the group "Commercial cooperative communication" come from the Enterprise AA, the Enterprise BB, and the Enterprise CC respectively, and the user A sets the Enterprise AA as an internal related enterprise and the Enterprise BB as a related external enterprise, then the group members affiliated with the Enterprise CC are automatically removed from the group "Commercial cooperative communication." Accordingly, once the group "Commercial cooperative communication" has been upgraded to a cooperative group, removal prompt information 1502 may be shown for the group members of the Enterprise CC on the communication session interface 1500 as shown in FIG. 15. For example, the removal prompt information 1502 may be, "You will remove E, H, and L from the group chat," and the group members being removed may simultaneously receive removal notice information 1600 such as that shown in FIG. 16.

In similar fashion to the communication session interface 1100 shown in FIG. 11 above, an enterprise tag 1506 corresponding to group members may also be shown on a communication session interface 1500. For example, when the user B belongs to the Enterprise AA, the enterprise tag 1506 may be the "Enterprise AA."

In addition to changing a common group to a cooperative group, the present disclosure may also support any other changes among group types, such as a change from a common group to an internal group, from an internal group to a cooperative group, from an internal group to a common group, from a cooperative group to an internal group, and change from a cooperative group to a common group. The present disclosure imposes no limitations in this regard. In what follows, a change from a common group to an internal group is used as an example to describe the technical solution of the present disclosure.

Figure 17:
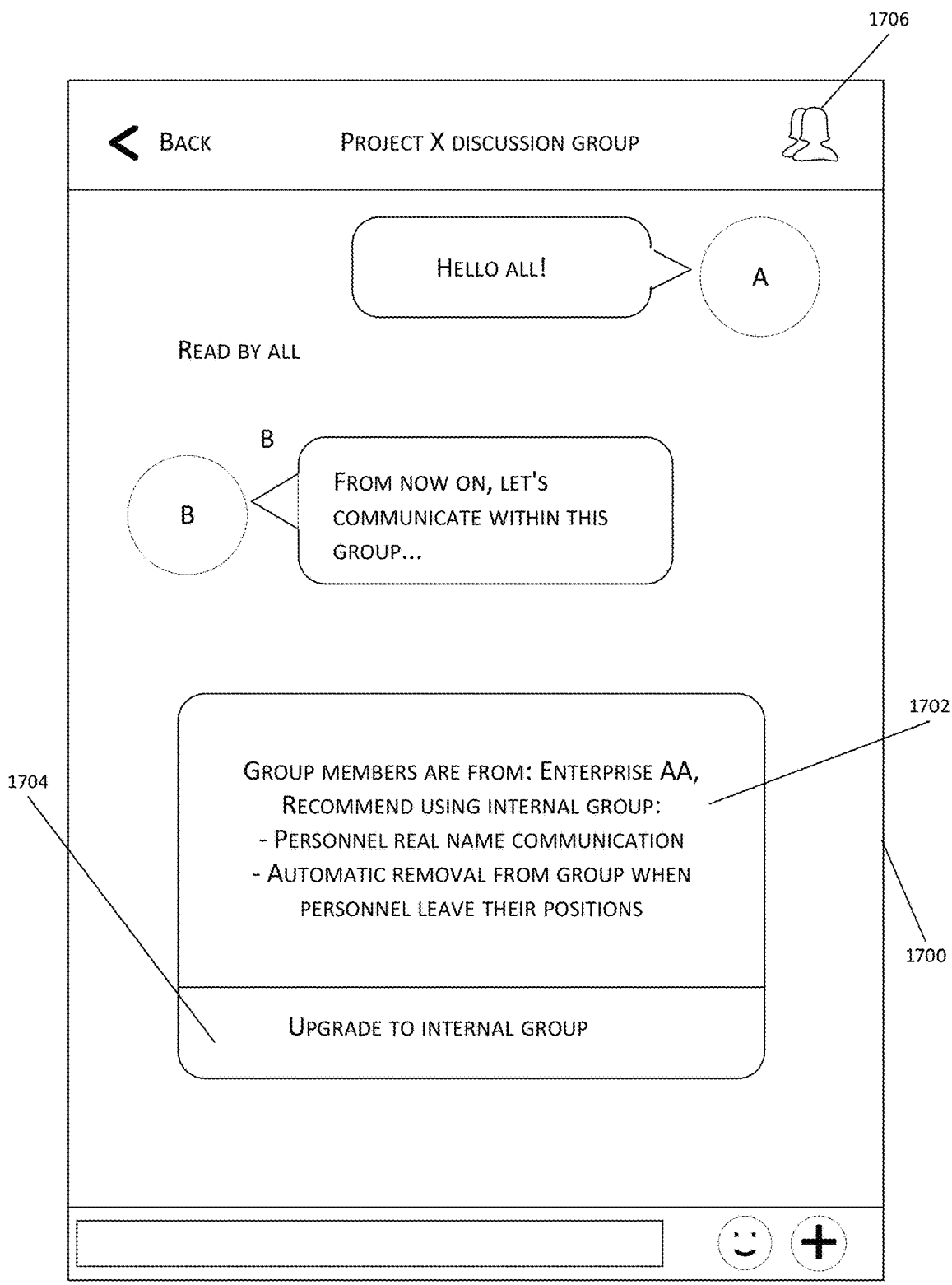
FIG. 17 is a schematic diagram of an interface for recommending an upgrading to an internal group provided in an example embodiment.

FIG. 17 is a schematic diagram of an interface for recommending an upgrading to an internal group provided in an example embodiment. In a manner similar to the example embodiment shown in FIG. 13, assuming that user the A has created a group "Project X discussion group," and if the EIM server, based on the group affiliation information of the group members in the group "Project X discussion group," discovers that only one enterprise is present (such as the "Enterprise AA"), it may automatically launch a change prompt to the user A, such that the user A receives type change prompt information 1702 on a communication session interface 1700 corresponding to the group "Project X discussion group" as shown in FIG. 17. This will allow the user A to automatically switch the group to an internal group or switch the interface to the group type selection interface 700 as shown in FIG. 7 by trigger a corresponding change trigger option 1704. This allows the user A to select and change to a required group type based on actual conditions.

In similar fashion to the example embodiment shown in FIG. 13, the user A may also trigger an interface access 1706 contained in a communication session interface 1700 to switch (either directly, or indirectly via a group configuration interface similar to that shown in FIG. 14) the interface to the group type selection interface 700 such as that shown FIG. 7 to allow the user A to select and change to the required group type based on actual conditions.

Figure 18:
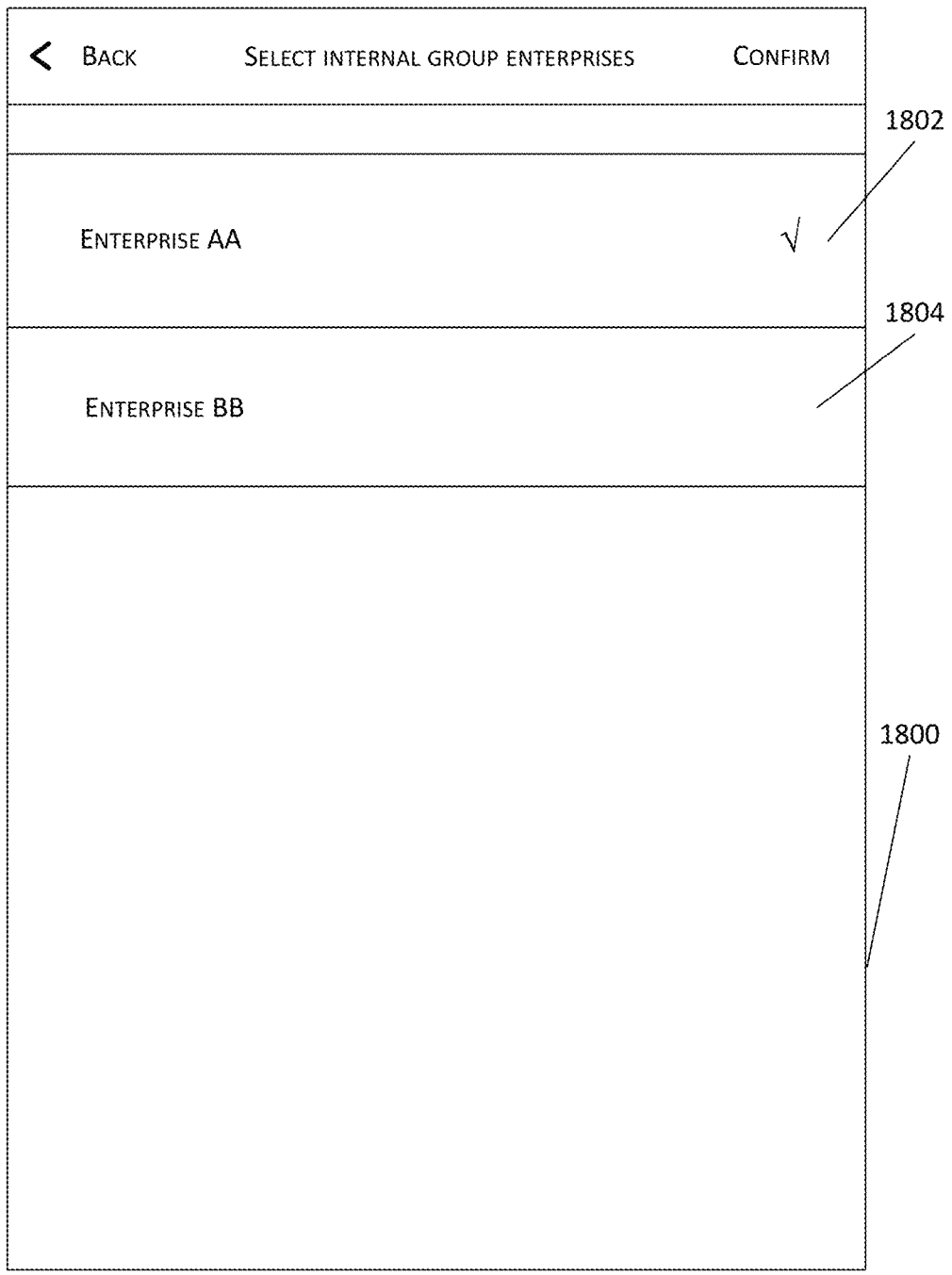
FIG. 18 is a schematic diagram of an interface for selecting an internal group enterprise provided in an example embodiment.

When the user A desires to change the group "Project X discussion group" from a common group to an internal group, the EIM server 1 may show the user A an internal group enterprise selection interface 1800 such as that shown in FIG. 18. The user A then triggers an option 1802 corresponding to the Enterprise AA or an option 1804 corresponding to the Enterprise AB to set the Enterprise AA or Enterprise AB to which the user A belongs to an internal group corresponding to the group "Project X discussion group." Then, assuming that the user A sets the Enterprise AA as an internal group corresponding to the group "Project X discussion group," group members of the group "Project X discussion group" may be limited to the enterprise members of the Enterprise AA, preventing other users that are not internal members of the Enterprise AA from joining the group "Project X discussion group" and preventing internal information leakage.

Contents relating to groups of the "Industry group" type will be described below with regard to an "Industry group" option 708 such as that shown in FIG. 7. In contrast to a "Cooperative group," which requires that a creator or administrator to select group members, the "Industry group" adopts an application mode to achieve the management of group members. Assuming that a user S wants to join a group "Internet industry exchange group" of the "Industry group" type, the user S may use an EIM client 4 running on an electronic device used thereby to search for the group "Internet industry exchange group."

Figure 19:
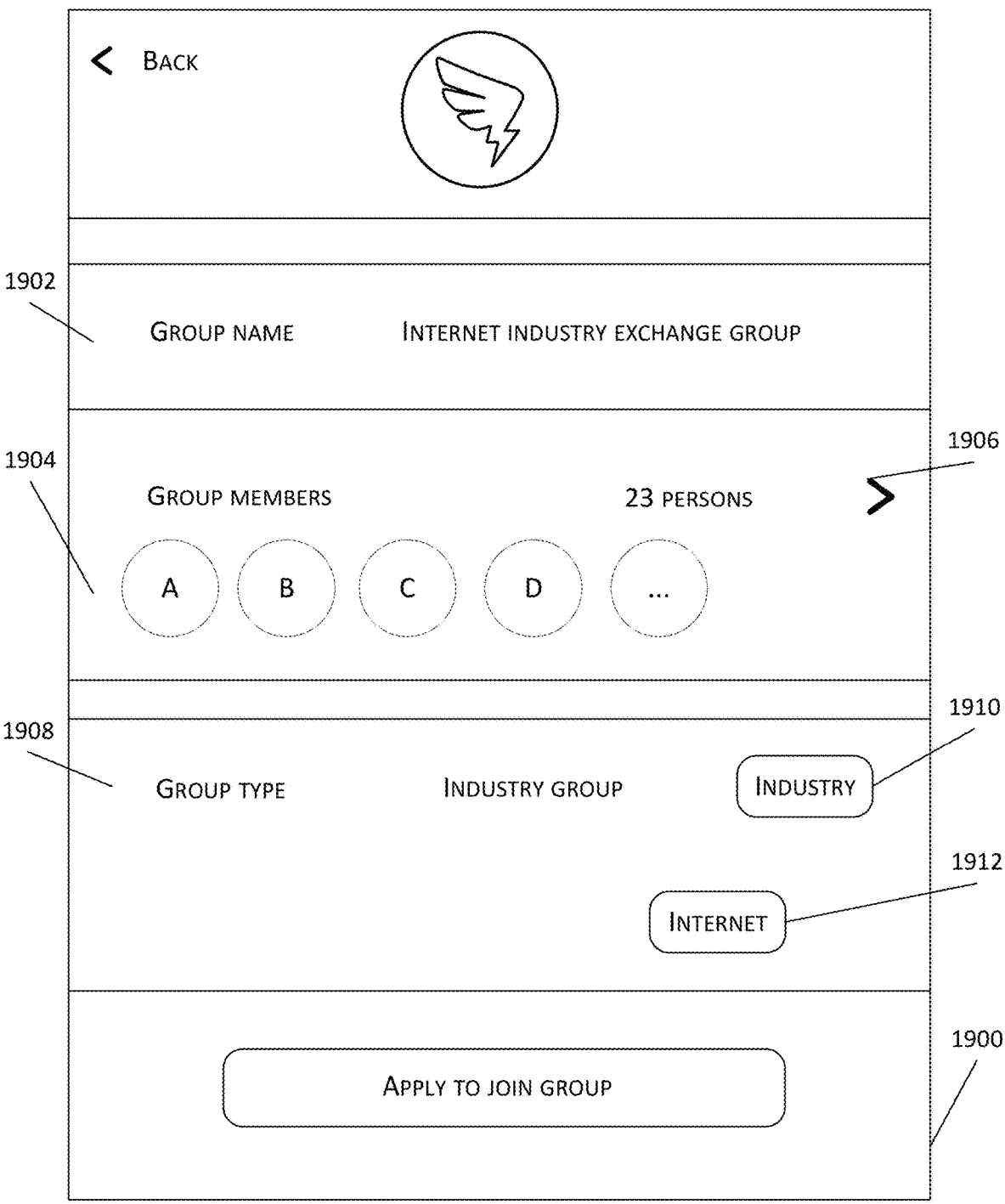
FIG. 19 is a schematic diagram of an interface for applying to join an industry group provided in an example embodiment.

For example, FIG. 19 is a schematic diagram of an interface for applying to join an industry group provided in an example embodiment. Based on the search for the group "Internet industry exchange group" by the user S, a group information display interface 1900 such as that shown in FIG. 19 may be viewed on the EIM client 4. The group information display interface 1900 may display information relating to the group "Internet industry exchange group" to the user S. For example, the related information may include group name information 1902. The related information may include group member information 1904, and the user S may further trigger an icon 1906 to view detailed information on the group members of the group "Internet industry exchange group." The related information may include group type information 1908. In addition to indicating the group type of the group "Internet industry exchange group" with the text "Industry group," it is also possible to show a type tag 1910 and an industry tag 1912 of the industry to which the group "Internet industry exchange group" belongs (for example, the content of the industry tag 1912 is "Internet," indicating that the group "Internet industry exchange group" belongs to the Internet industry; and corresponding industry names may similarly be adopted for other industry groups).

When the user S wishes to join the group "Internet industry exchange group," an "Apply to join the group" option on the group information display interface 1900 may be triggered to initiate an application to join the group "Internet industry exchange group."

In an example embodiment, an automatic determination mode may be used. For example, when the group "Internet industry exchange group" is set as being related to the Internet industry (or to one or more other industry types), the EIM server, upon receiving an application to join the group initiated by the user S, may determine the industry type of the group "Enterprise XX" to which the user S belongs. When the Enterprise XX belongs to the Internet industry, the EIM server may automatically agree to have the user S added as a member of the "Internet industry exchange group." When the Enterprise XX belongs to a non-Internet industry, such as mechanical processing, the EIM server may automatically reject the application to join the group that the user S initiates.

Figure 20:
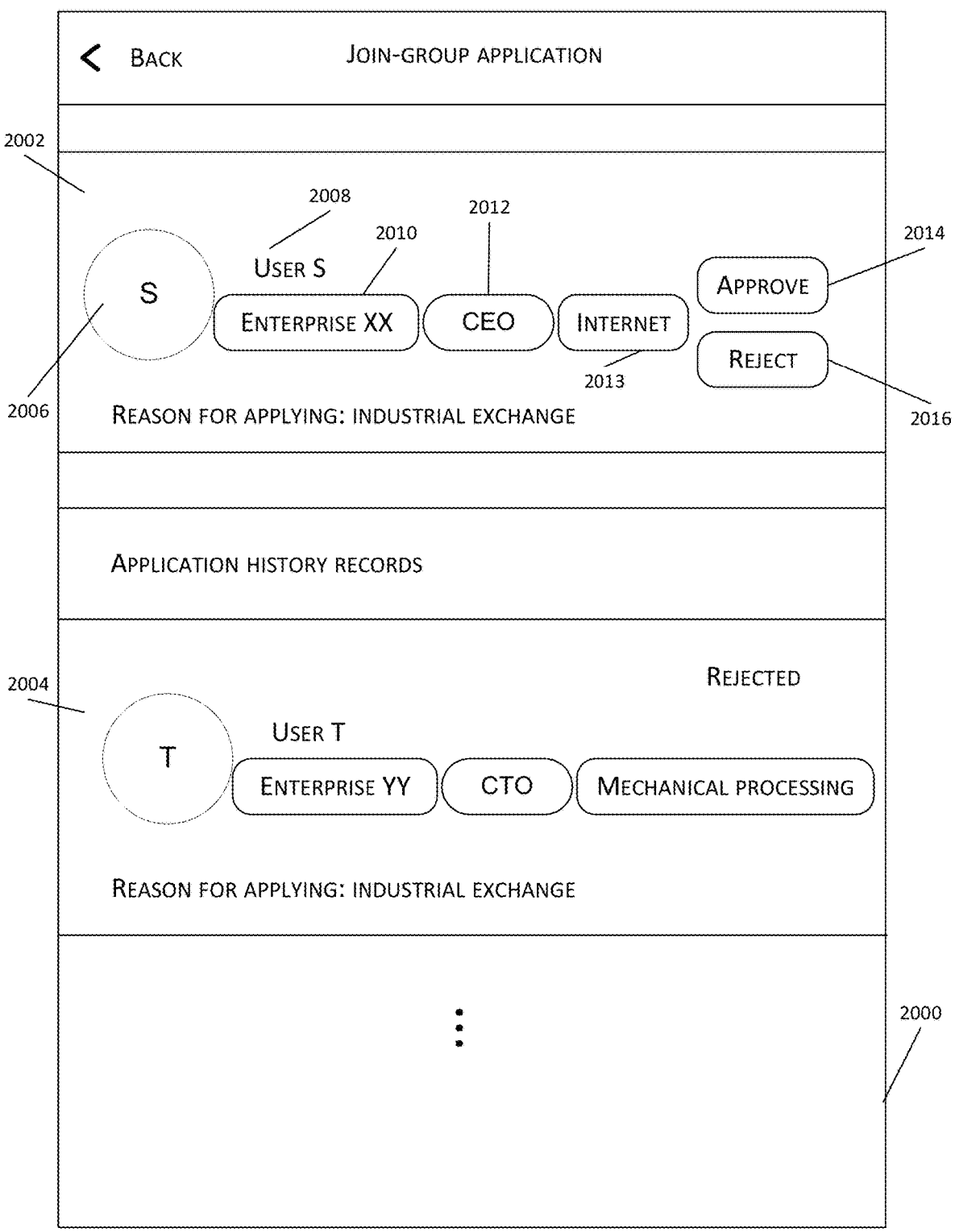
FIG. 20 is a schematic diagram of an interface for managing a group-joining application provided in an example embodiment.

In an example embodiment, the application to join the group initiated by the user S may be provided to the creator or administrator of the group "Internet industry exchange group," such that a decision of whether to approve the application to join the group according to the industry type of the group "Enterprise XX" to which the user S belongs may be made thereby. For example, FIG. 20 is a schematic diagram of an interface for managing a group joining application provided in an example embodiment. Assuming that the administrators of the group "Internet industry exchange group" include a user R, that an EIM client 5 running on an electronic device used thereby may receive the application to join the group initiated by the user S, then group-join application information 2002 corresponding to a group join application managing interface 2000 such as that illustrated in FIG. 20 may be shown. Similarly, regarding other group join applications initiated for the group "Internet industry exchange group," the group join application managing interface 2000 may likewise show the corresponding group-join application information, such as group join application information 2004 corresponding to a user T shown in FIG. 20.

In what follows, the group-join application information 2002 is used as an example to describe the information contents that may be obtained by user R. The information contents of the group-join application information 2004 and the like are similar and will not be further elaborated herein. As shown in FIG. 20, the group join application information 2002 may comprise a head portrait 2006 and a name 2008 of the user S as the applicant, an enterprise tag 2010 corresponding to the group "Enterprise XX" to which the user S belongs, a position tag 2012 corresponding to the position of the user S in the Enterprise XX, an industry tag 2013 corresponding to the industry to which the Enterprise XX belongs, and the like. The present disclosure imposes no limitations in this regard.

If the user R believes that the Enterprise XX belongs to the Internet industry and thus agrees that the user S joins the group "Internet industry exchange group," the user R may trigger an agree option 2014 on the group join application managing interface 2000, thereby allowing the user S to be added to the group "Internet industry exchange group." If the user R does not wish to allow the user S to join the group "Internet industry exchange group," the user R may ignore the group-join application information 2002 or trigger a reject option 2016 on the group-join application managing interface 2000. Similarly, for example, if a group "Enterprise YY" of a user T belongs to the mechanical processing industry and not the Internet industry, the user R may resolve the group-join application of the user T, with a processing result for the group-join application information 2004 shown thereby being "Rejected" and not "Approved."

Figure 21:
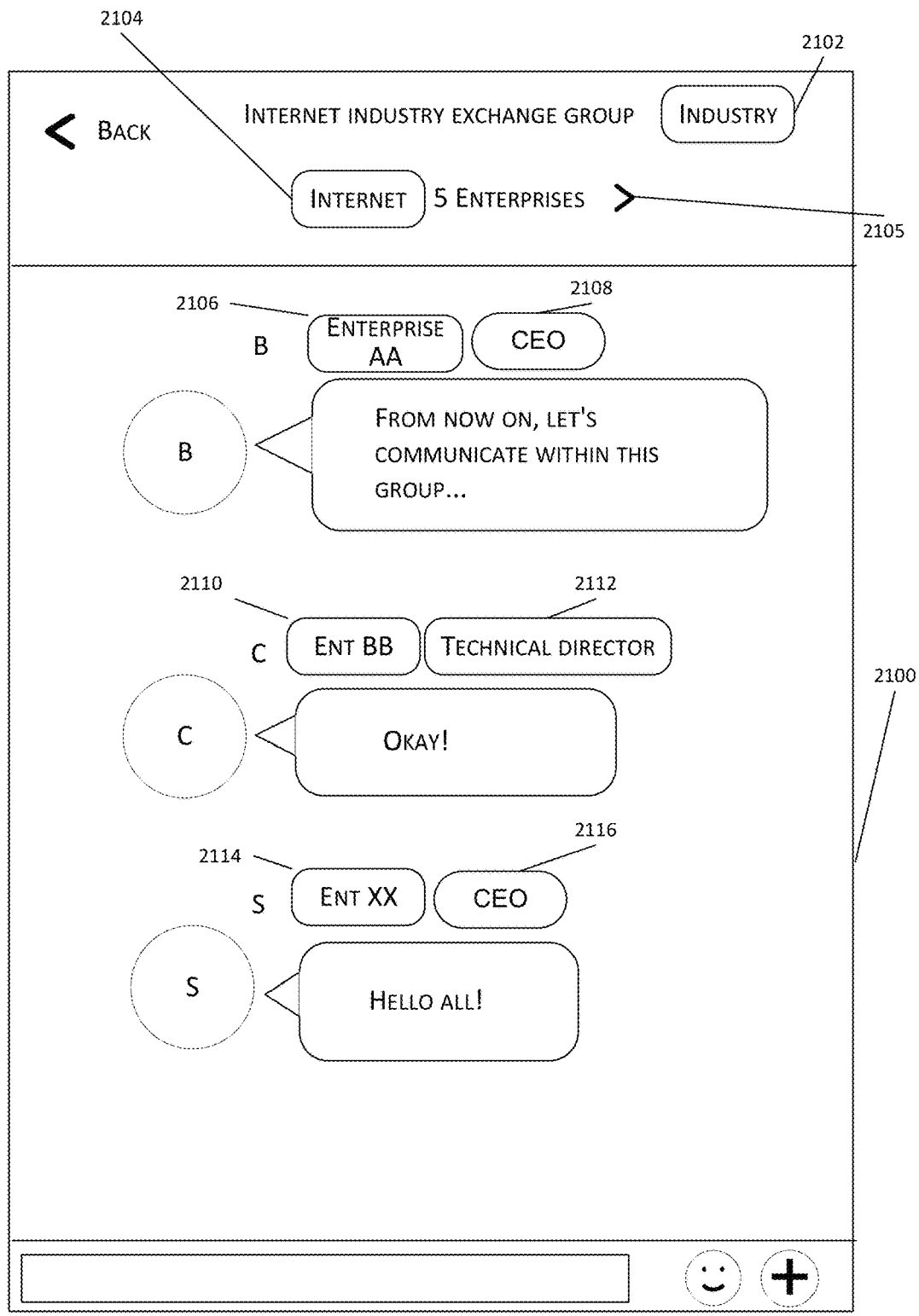
FIG. 21 is a schematic diagram of a communication session interface of an industry group provided in an example embodiment.

FIG. 21 is a schematic diagram of a communication session interface of an industry group provided in an example embodiment. Assuming that a communication session interface 2100 corresponding to the group "Internet industry exchange group" is illustrated in FIG. 21, then group members the user B, the user C, the user S, and the like may communicate by respectively using the EIM client 2, the EIM client 3, the EIM client 4, and the like.

In an example embodiment, when the group "Internet industry exchange group" belongs to an industry group, the communication session interface 2100 may show tag information 2102 as that shown in FIG. 21 to clearly indicate that the group type is that of the "industry" type, and to help group members to distinguish this group from others. When the group "Internet industry exchange group" is affiliated with the Internet industry, the communication session interface 2100 may show tag information 2104 as that shown in FIG. 21 to clearly indicate that the industry type is the "Internet" industry.

In an example embodiment, when the group "Internet industry exchange group" is an industry group, the communication session interface 2100 may show enterprise number prompting information "5 enterprises" as shown in FIG. 21 to clearly indicate that the group members of the group "Internet industry exchange group" are affiliated with 5 groups. At the same time, when a triggering operation on an icon 2105 has been detected, the information of the corresponding 5 groups may be displayed, which will not be detailed herein.

In an example embodiment, when the group "Internet industry exchange group" is an industry group, the communication session interface 2100 may show the group affiliation information of each group member. For example, when the user B belongs to the Enterprise AA and when a communication message is received from the user B, an enterprise tag 2106 as illustrated in FIG. 21 may be shown in a display region related to the communication message. The contents of the enterprise tag 2106 may include "Enterprise AA." When the user C belongs to the Enterprise BB and when a communication message is received from the user C, an enterprise tag 2110 as illustrated in FIG. 21 may be shown in a display region related to this communication message. The contents of the enterprise tag 2110 may comprise "Enterprise BB." When the user S belongs to the Enterprise XX and when a communication message is received from the user S, an enterprise tag 2114 as illustrated in FIG. 21 may be shown in a display region related to this communication message. The contents of the enterprise tag 2114 may comprise "Enterprise XX." Additionally, group members may mutually view group affiliation information of one another through other methods. For example, the personal information of other group members may be viewed. The present disclosure imposes no limitations in this regard.

In an example embodiment, when the group "Internet industry exchange group" belongs to an industry group, the communication session interface 2100 may show position information of each group member within the groups to which they belong. For example, when a position of the user B in the Enterprise AA is CEO, for a communication message received from the user B, a position tag 2108 as that illustrated in FIG. 21 may be shown within a display region related to the communication message. The contents of the position tag 2108 may include "CEO." When a position of the user C in the Enterprise BB is technical director, for a communication message received from the user C, a position tag 2112 as that illustrated in FIG. 21 may be shown within a display region related to the communication message. The contents of the position tag 2112 may include "technical director." When a position of the user S in the Enterprise XX is CEO, for a communication message received from the user S, a position tag 2116 as that illustrated in FIG. 21 may be shown within a display region related to the communication message. The contents of the position tag 2116 may include "CEO." Additionally, group members may mutually view position information through other methods. For example, the personal information of other group members may be viewed. The present disclosure imposes no limitations in this regard.

For an "Industry group," in similar fashion to a "Cooperative group" in the example embodiments set forth above, it is also possible to switch between various types, such as switching from a "Common group," "Internal group," "Cooperative group," or the like to an "Industry group." For example, when a group is switched from a type to an "Industry group," it is possible to automatically delete group members based on the related industry type after the group has been switched to the "Industry group" and the industry types of the groups to which the original group members within the group belonged. Similarly, it is possible to switch from the "Industry group" to the "Common group," "Internal group," "Cooperative group," and other types of groups. Details will not be provided herein.

In this regard, for a group of the "Industry group" type, when a group member is no longer employed, the EIM server may learn the dismissing status based on the organizational structure of a corresponding group and automatically remove the group member from the corresponding group to prevent information leakage.

Figure 22:
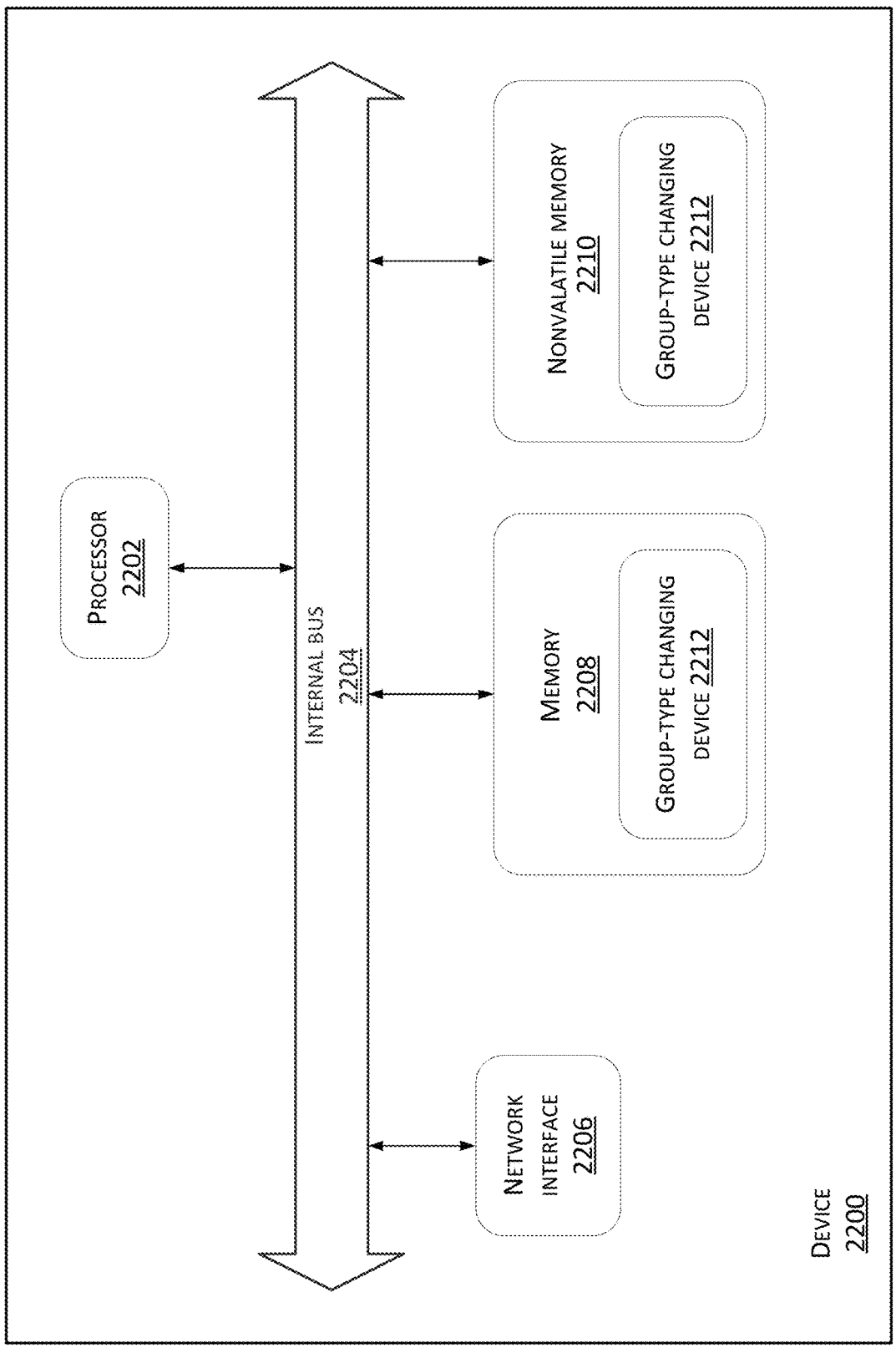
FIG. 22 is a structural schematic diagram of a device provided in an example embodiment.

FIG. 22 is a structural schematic diagram of a device provided in an example embodiment. Please refer to FIG. 22. At the hardware level, this electronic device 2200 comprises a processor 2202, an internal bus 2204, a network interface 2206, a memory 2208, and a non-volatile memory 2210. Both the memory 2208 and the non-volatile memory 2210 are examples of the computer-readable media. Certainly, the device may further comprise other hardware required for business. The processor 2202 reads a corresponding computer program from the non-volatile memory 2210 into the memory 2208 and then runs it, forming a group-type changing device 2212. Certainly, in addition to the software implementation mode, one or more example embodiments of the present disclosure do not exclude other implementation modes such as using logic devices or a combination of software and hardware. That is to say, the entity executing the following process flow is not limited to individual logic units and may include hardware or logic devices.

Figure 23:
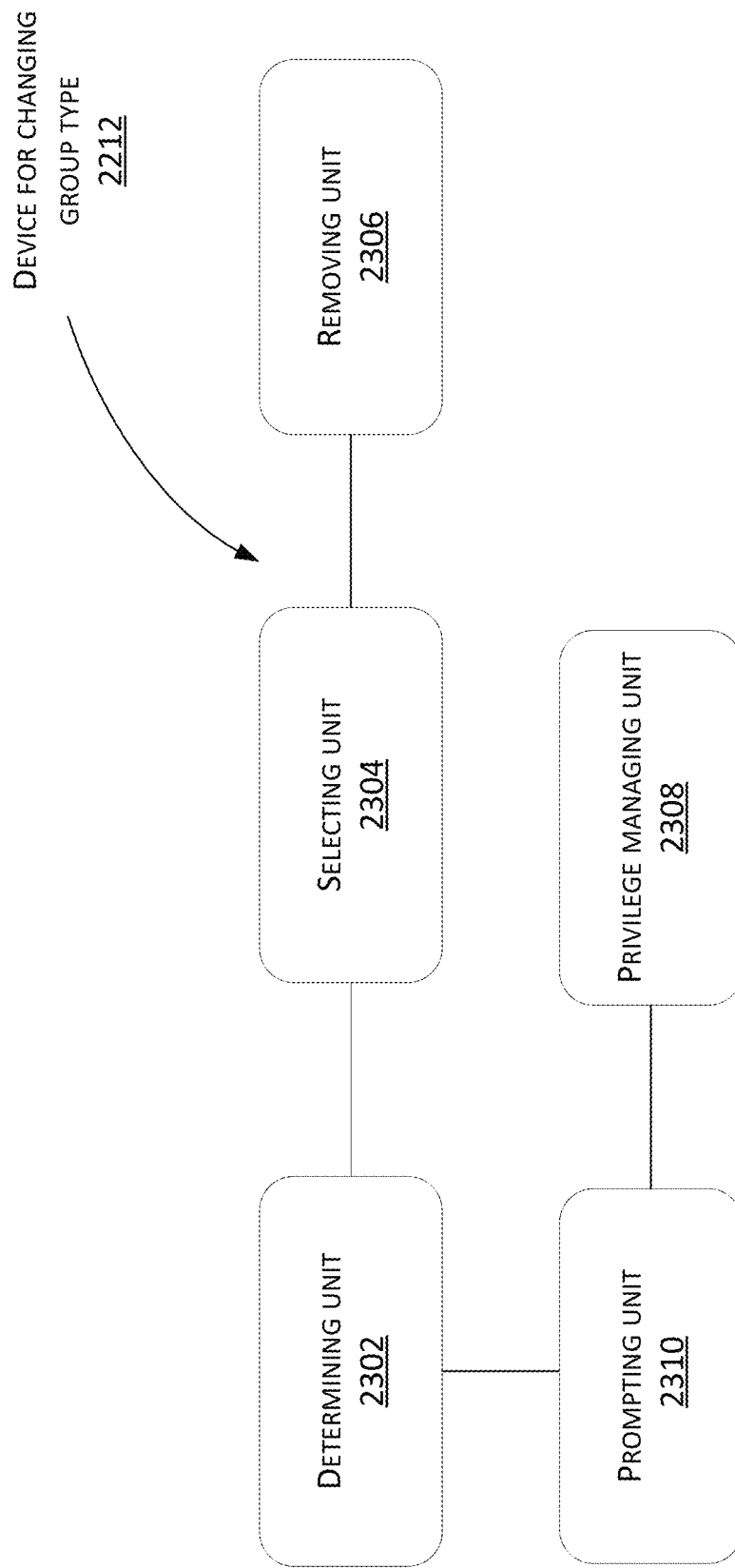
FIG. 23 is a block diagram of a device for changing a group type provided in an example embodiment.

Please refer to FIG. 23, the device for changing a group type 2212 may comprise:

a determining unit 2302, configured to, according to a limiting condition for group affiliation information of group members imposed by the target group type, select group members within the group not satisfying the limiting condition; and a selecting unit 2304, configured to, which, based on a limiting condition imposed on the group affiliation information of group members by the target group type, selects those group members within the group that do not satisfy the limiting condition; and a removing unit 2306, configured to remove the selected group members from the group.

For example, the type change instruction is used to change an original group type of the group to another group type among alternative group types. The alternative group types comprise at least one of the following:

a common group, wherein the common group imposes no limitations on the group affiliation information of group members;

a cooperative group, wherein the cooperative group limit the group affiliation information of group members to a plurality of set related groups; and an internal group, wherein the internal group limiting the group affiliation information of group members to a set internal group.

For example, the selecting unit 2304 is configured to:

when a limiting condition corresponds to the target group type limits the group affiliation information of group members to a set group, confirm a group needed to be set with an administrative member of the group; and according to a confirmation result returned by the administrative member, select, from the group, group members having group affiliation information unrelated to a group set by the administrative member.

For example, the group set by the administrative member comprises:

at least one internal group to which the administrative member belongs; or at least one internal group to which the administrative member belongs and at least one external group to which other group members in the group belong, wherein the administrative member does not belong to the external group.

For example, the device for changing a group type 2212 further comprises:

a privilege managing unit 2308, configured to, when the target group type results in the group affiliation information among group members in the group not completely identical, grant group members in the group a privilege to mutually browse group affiliation information.

For example, when any one group member transmits a group message based on a communication session corresponding to the group, the group message on a communication session interface corresponding to the communication session is displayed, and the group affiliation information of the any one group member is further shown in a related display region corresponding to the group message on the communication session interface.

For example, the device for changing a group type 2212 further comprises:

a prompting unit 2310, configured to transmit a type change prompt message to an administrative member of the group, wherein wherein the determining unit 2302 is configured to, according to an operation made by the administrative member in response to the type change prompt message, receive the type change instruction returned by the administrative member.

For example, the prompting unit 2310 is configured to:

acquire the group affiliation information of the group members in the group; and when the group affiliation information of at least some of the group members satisfies the limiting condition for the group affiliation information of the group members imposed by any one alternative group type, transmit to the administrative member of the group the type change prompt message for the any one alternative group type.

Figure 24:
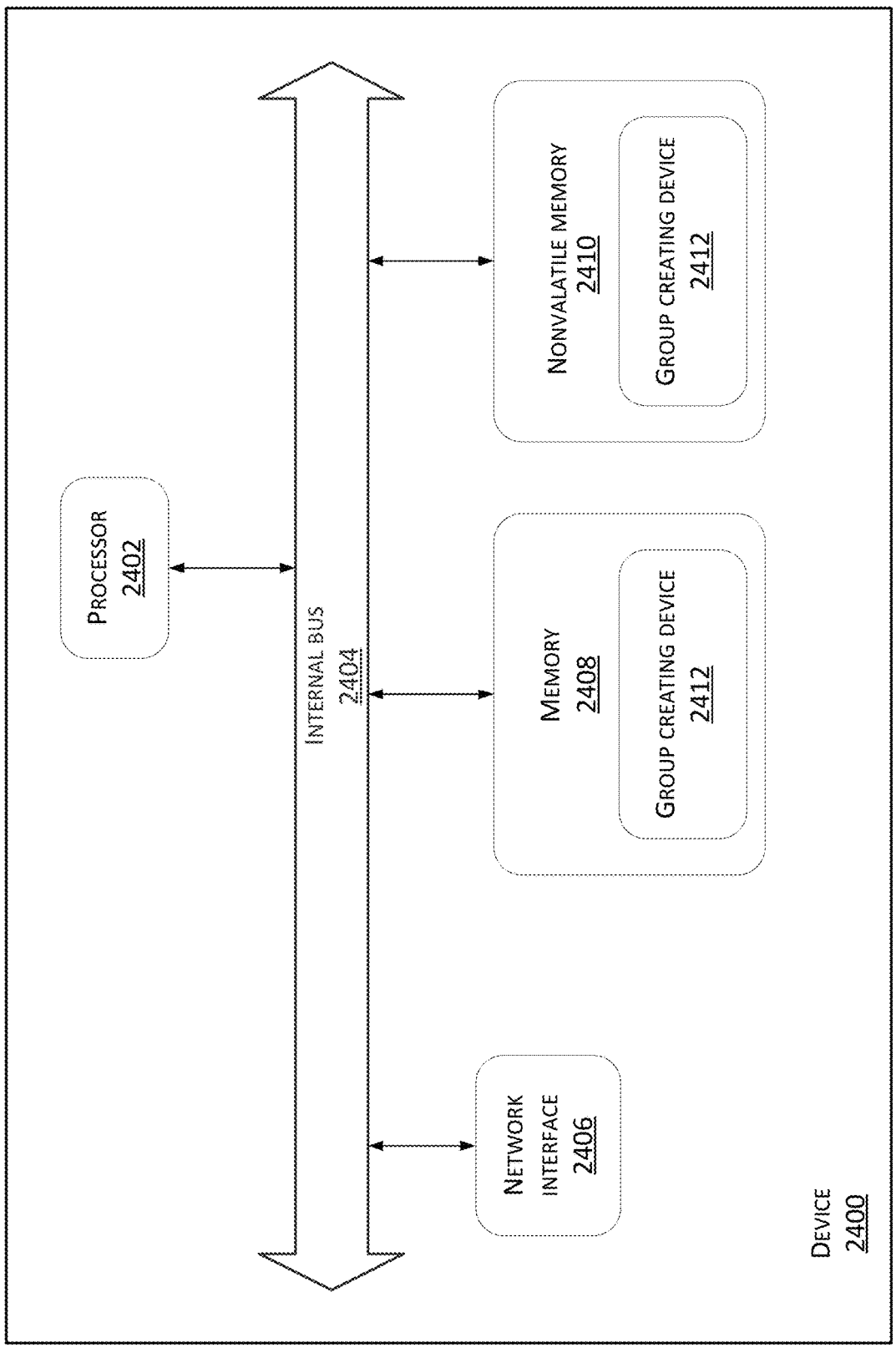
FIG. 24 is a structural schematic diagram of a device provided in an example embodiment.

FIG. 24 is a structural schematic diagram of a device provided in an example embodiment. Please refer to FIG. 24. At the hardware level, the electronic device comprises a processor 2402, an internal bus 2404, a network interface 2406, a memory 2408, and a non-volatile memory 2410. Both the memory 2408 and the non-volatile memory 2410 are examples of the computer-readable media. Certainly, it may further comprise other hardware required for business. The processor 2402 reads a corresponding computer program from the non-volatile memory 2410 into the memory 2408 and then runs it, forming a group creating device 2412. Certainly, in addition to the software implementation mode, one or more example embodiments of the present disclosure do not exclude other implementation modes such as using logic devices or a combination of software and hardware. That is to say, the entity executing the following process flow is not limited to individual logic units, and may include hardware or logic devices.

Figure 25:
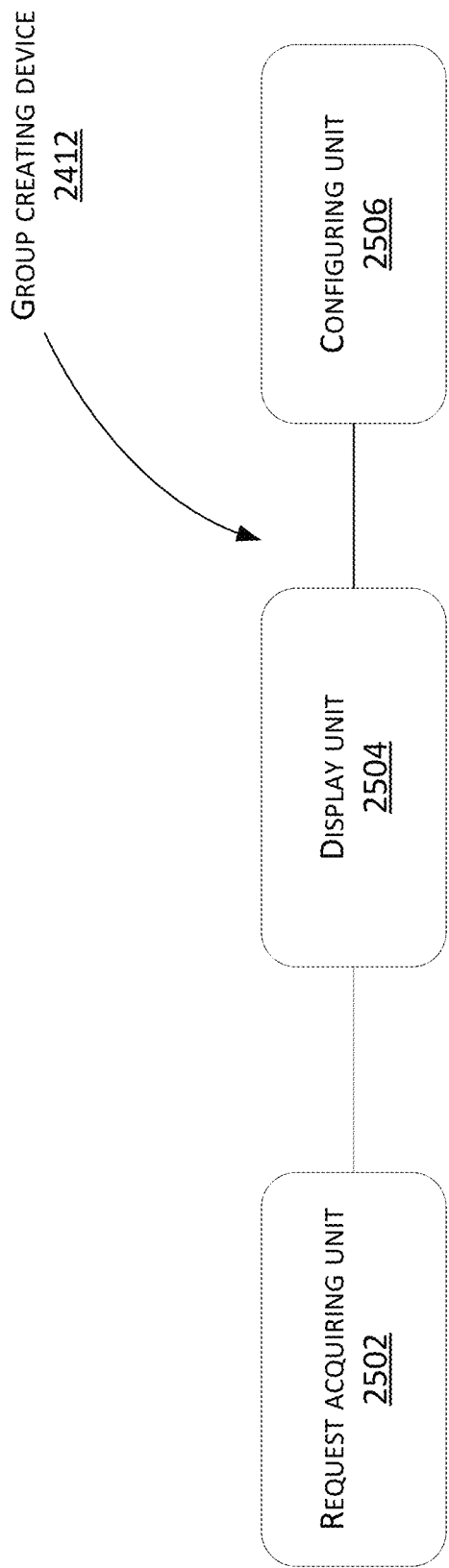
FIG. 25 is a block diagram of a device for creating a group provided in an example embodiment.

Please refer to FIG. 25. The group creating device 2512 may comprise:

a request acquiring unit 2502, configured to acquire a creating request initiated by a creator with regard to a cooperative group;

a display unit 2504, configured to, according to group members selected by the creator for the cooperative group, display to the creator groups to which the group members belong, and the groups serve as alternative groups; and a configuring unit 2506 configured to configure a plurality of alternative groups selected by the creator as related groups of the cooperative group, so as to limit group affiliation information of the group members in the cooperative group to the related groups.

For example, the system, devices, modules, or units of the example embodiments set forth above may be implemented with computer chips or entities or may be implemented with products with certain functions. A typical implementation device is a computer. The specific form of the computer may be that of a personal computer, laptop computer, cellular telephone, camera phone, smart phone, personal digital assistant, media player, navigation device, e-mail transmitting and receiving device, game controller, tablet calculator, wearable device, or a combination of any several of these devices.

In one typical configuration, a computer comprises one or more processing units (CPUs), input/output interfaces, network interfaces, and memory.

The memory may comprise the forms of volatile memory on a computer readable medium, random-access memory (RAM), and/or non-volatile memory, such as read-only memory (ROM) and flash memory (flash RAM). A memory is an example of a computer-readable medium.

Computer-readable media further include non-volatile and volatile, removable and non-removable media which may implement information storage by using any methods or techniques. The information may be a computer-readable instruction, digital structure, program module, or some other data. Examples of computer storage media include, but are not limited to, phase-change memory (PRAM), static random access memory (SRAM), dynamic random access memory (DRAM), other random access memory (RAM), read-only memory (ROM), electrically erasable programmable read-only memory (EEPROM), flash memory and other memory technologies, optical disc read-only memory (CD-ROM), digital multifunctional discs (DVD), and other optical storage, magnetic tape, magnetic disk storage, quantum memory, graphene-based storage medium, or other magnetic storage devices or any other non-transmission medium, which may be used to store information that may be accessed by computer equipment. As defined in the present disclosure, computer-readable media do not include transitory media such as modulated data signals or carriers.

It merits further describing that the term "including," "comprising," or any variants thereof is intended to cover nonexclusive inclusion; and thus a process, method, product, or device comprising a series of elements include not just those elements, but also other elements not clearly listed, or further include elements that are intrinsic to that type of process, method, product, or device. Absent further limitation, the elements defined by the phrase "comprising a . . . " do not exclude the existence of other similar elements in the process, method, product, or device of the stated elements.

Specific example embodiments of the present disclosure have been described above. Other example embodiments lie within the scope of the attached claims. Under certain circumstances, the operations or steps described in the claims may be implemented in a sequence differing from that in the example embodiments while still achieving the expected results. Additionally, the processes illustrated in the drawings may not necessarily require the specific sequence or continuous sequence that is shown to achieve the expected results. In these implementation modes, multitasking or parallel processing is possible or advantageous.

The terms employed in one or more example embodiments of the present disclosure are merely for the purpose of describing a specific example embodiment, and not for the purpose of limiting one or more example embodiments of the present disclosure. The singular forms "a," "said," and "the" employed in one or more example embodiments and the claims of the present disclosure are intended to include the plural forms, unless the context clearly indicates otherwise. It should also be understood that the term "and/or" employed in the present text refers to and includes any and all possible combinations of one or more related enumerated items.

It is to be understood that although one or more example embodiments of the present disclosure may employ the term first, second, third, or the like to describe various information, this information is not to be limited to these terms. These terms are merely used to distinguish various information of the same type. For example, without departing from the scope of one or more example embodiments of the present disclosure, the first information may also be referred to as the second information, and similarly, the second information may be referred to as the first information. Depending on the context, the word "if" as used herein may be interpreted as "when . . . ", "at the time when . . . ", or "in response to determination."

The description set forth above is merely one or more example embodiments and should not be used to limit the example embodiments of the present disclosure. All modifications, equivalent substitutions, improvements, and the like made within the spirit and principles of one or more example embodiments of the present disclosure shall fall within the protection scope of one or more example embodiments of the present disclosure.

The present disclosure may further be understood with clauses as follows.

Clause 1. A method for changing a group type, comprising:

determining, according to a received type change instruction with respect to a group, a target group type of the group;

selecting, according to a limiting condition on group affiliation information of group members imposed by the target group type, group members within the group not satisfying the limiting condition; and removing the selected group members from the group.

Clause 2. The method according to clause 1, wherein the type change instruction is used to change an original group type of the group to another group type among alternative group types; the alternative group types comprise at least one of the following:

a common group, wherein the common group imposes no limitations on the group affiliation information of group members;

a cooperative group, wherein the cooperative group limit the group affiliation information of group members to a plurality of set related groups;

an internal group, wherein the internal group limiting the group affiliation information of group members to a set internal group; and an industry group, wherein the industry group limiting the group affiliation information of group members to one or more set industry types.

Clause 3. The method according to clause 1, wherein the selecting, according to a limiting condition for group affiliation information of group members imposed by the target group type, group members within the group not satisfying the limiting condition comprises:

when a limiting condition corresponds to the target group type limits the group affiliation information of group members to a set group, confirming a group needed to be set with an administrative member of the group; and according to a confirmation result returned by the administrative member, selecting, from the group, group members having group affiliation information unrelated to a group set by the administrative member.

Clause 4. The method according to clause 3, wherein the group set by the administrative member comprises:

at least one internal group to which the administrative member belongs; or at least one internal group to which the administrative member belongs and at least one external group to which other group members in the group belong, wherein the administrative member does not belong to the external group.

Clause 5. The method according to clause 1, further comprising:

when the target group type results in the group affiliation information among group members in the group not completely identical, granting group members in the group a privilege to mutually browse group affiliation information.

Clause 6. The method according to clause 5, wherein when any one group member transmits a group message based on a communication session corresponding to the group, displaying the group message on a communication session interface corresponding to the communication session, and the group affiliation information of the any one group member is further shown in a related display region corresponding to the group message on the communication session interface.

Clause 7. The method according to clause 1, further comprising:

transmitting a type change prompt message to an administrative member of the group; and according to an operation made by the administrative member in response to the type change prompt message, receiving the type change instruction returned by the administrative member.

Clause 8. The method according to clause 7, wherein the transmitting a type change prompt message to an administrative member of the group comprises:

acquiring the group affiliation information of the group members in the group; and when the group affiliation information of at least some of the group members satisfies the limiting condition for the group affiliation information of the group members imposed by any one alternative group type, transmitting to the administrative member of the group the type change prompt message for the any one alternative group type.

Clause 9. A method for creating a group, comprising:

acquiring a creating request initiated by a creator with regard to a cooperative group;

according to group members selected by the creator for the cooperative group, displaying to the creator groups to which the group members belong, and the groups serve as alternative groups; and configuring a plurality of alternative groups selected by the creator as related groups of the cooperative group, so as to limit group affiliation information of the group members in the cooperative group to the related groups.

Clause 10. A device for changing a group type, comprising:

a determining unit, configured to, according to a received type change instruction with respect to a group, determine a target group type of the group;

a selecting unit, configured to, according to a limiting condition for group affiliation information of group members imposed by the target group type, select group members within the group not satisfying the limiting condition; and a removing unit configured to remove the selected group members from the group.

Clause 11. The device according to clause 10, wherein the type change instruction is used to change an original group type of the group to another group type among alternative group types; the alternative group types comprise at least one of the following:

a common group, wherein the common group imposes no limitations on the group affiliation information of group members;

a cooperative group, wherein the cooperative group limits the group affiliation information of group members to a plurality of set related groups;

an internal group, wherein the internal group limits the group affiliation information of group members to a set internal group; and an industry group, wherein the industry group limits the group affiliation information of group members to one or more set industry types.

Clause 12. The device according to clause 10, wherein the selecting unit is specifically configured to:

when a limiting condition corresponds to the target group type limits the group affiliation information of group members to a set group, confirm a group needed to be set with an administrative member of the group; and according to a confirmation result returned by the administrative member, select, from the group, group members having group affiliation information unrelated to a group set by the administrative member.

Clause 13. The device according to clause 12, wherein the group set by the administrative member comprises:

at least one internal group to which the administrative member belongs; or at least one internal group to which the administrative member belongs and at least one external group to which other group members in the group belong, wherein the administrative member does not belong to the external group.

Clause 14. The device according to clause 10, further comprising:

a privilege managing unit, configured to, when the target group type results in the group affiliation information among group members in the group not completely identical, grant group members in the group a privilege to mutually browse group affiliation information.

Clause 15. The device according to clause 14, wherein when any one group member transmits a group message based on a communication session corresponding to the group, the group message on a communication session interface corresponding to the communication session is displayed, and the group affiliation information of the any one group member is further shown in a related display region corresponding to the group message on the communication session interface.

Clause 16. The device according to clause 10, further comprising:

a prompting unit, configured to transmit a type change prompt message to an administrative member of the group, wherein the determining unit is configured to, according to an operation made by the administrative member in response to the type change prompt message, receive the type change instruction returned by the administrative member.

Clause 17. The device according to clause 16, wherein the prompting unit is specifically configured to:

acquire the group affiliation information of the group members in the group; and when the group affiliation information of at least some of the group members satisfies the limiting condition for the group affiliation information of the group members imposed by any one alternative group type, transmit to the administrative member of the group the type change prompt message for the any one alternative group type.

Clause 18. A device for creating a group, comprising:

a request acquiring unit, configured to acquire a creating request initiated by a creator with regard to a cooperative group;

a display unit, configured to, according to group members selected by the creator for the cooperative group, display to the creator groups to which the group members belong, and the groups serve as alternative groups; and a configuring unit configured to configure a plurality of alternative groups selected by the creator as related groups of the cooperative group, so as to limit group affiliation information of the group members in the cooperative group to the related groups.

What is claimed is:

1. A method comprising:

determining, according to a received type change instruction with respect to a group, a target group type of the group, the received type change instruction being based on group affiliation information of at least some group members of the group satisfying a limiting condition for group affiliation information of the group members imposed by an alternative group type;
selecting, according to the limiting condition, a group member within the group that does not satisfy the limiting condition; and
removing the selected group member from the group.

2. The method of claim 1, wherein the type change instruction is used to change an original group type of the group to another group type among alternative group types.

3. The method of claim 2, wherein the alternative group types comprise at least one of the following:
a common group, wherein the common group imposes no limitations on the group affiliation information of the group members;
a cooperative group, wherein the cooperative group limits the group affiliation information of the group members to a plurality of set related groups;
an internal group, wherein the internal group limits the group affiliation information of the group members to a set internal group; and
an industry group, wherein the industry group limits the group affiliation information of the group members to one or more set industry types.

4. The method according to claim 1, wherein the selecting, according to the limiting condition, the group member within the group that does not satisfy the limiting condition comprises:
determining that the limiting condition corresponds to the target group type limits the group affiliation information of group members to a set group;
confirming the group needed to be set with an administrative member of the group; and
according to a confirmation result returned by the administrative member, selecting, from the group, group members having group affiliation information unrelated to the group set by the administrative member.

5. The method according to claim 4, wherein the group set by the administrative member comprises at least one internal group to which the administrative member belongs.

6. The method according to claim 4, wherein the group set by the administrative member further comprises at least one external group to which other group members in the group belong, wherein the administrative member does not belong to the external group.

7. The method according to claim 1, further comprising:
determining that the target group type results in that the group affiliation information among the group members in the group are not the same; and
granting the group members in the group a privilege to mutually browse the group affiliation information.

8. The method according to claim 7, further comprising displaying a group message from a group member based on a communication session on a communication session interface corresponding to the communication session.

9. The method according to claim 8, further comprising displaying the group affiliation information of the group member in a related display region corresponding to the group message on the communication session interface.

10. The method according to claim 1, further comprising:
transmitting a type change prompt message to an administrative member of the group; and
according to an operation made by the administrative member in response to the type change prompt message, receiving the type change instruction returned by the administrative member.

11. The method according to claim 10, wherein the transmitting the type change prompt message to the administrative member of the group comprises:
acquiring the group affiliation information of group members in the group;
determining that the group affiliation information of the at least some group members satisfies the limiting condition for the group affiliation information of the group members imposed by the alternative group type; and
transmitting to the administrative member of the group the type change prompt message for the alternative group type.

12. The method according to claim 1, wherein group affiliation information of a respective group member includes information indicating a group to which the respective group member belongs.

13. A device comprising:
one or more processors; and
one or more computer-readable media storing computer-readable instructions that, executable by the one or more processors, cause the one or more processors to perform acts comprising:
acquiring a creating request initiated by a creator with regard to a cooperative group;
according to group members selected by the creator for the cooperative group, displaying to the creator groups to which the group members belong, the groups displayed to the creator serving as alternative groups;
receiving one or more alternative groups selected by the creator from the alternative groups as related groups of the cooperative group; and
limiting group affiliation information of the group members in the cooperative group to the related groups based on group affiliation information of at least some group members in the cooperative group satisfying a limiting condition for the group affiliation information of the group members imposed by one or more alternative group types of the one or more alternative groups.

14. The device according to claim 13, wherein group affiliation information of a respective group member includes information indicating a group to which the respective group member belongs.

15. One or more computer-readable media storing computer-readable instructions that, executable by one or more processors, cause the one or more processors to perform acts comprising:
determining, according to a received type change instruction with respect to a group, a target group type of the group, the received type change instruction being based on group affiliation information of at least some group members of the group satisfying a limiting condition for group affiliation information of the group members imposed by an alternative group type;
selecting, according to the limiting condition, a group member within the group that does not satisfy the limiting condition; and
removing the selected group member from the group.

16. The one or more computer-readable media of claim 15, wherein:
the type change instruction is used to change an original group type of the group to another group type among alternative group types; and
the alternative group types comprise at least one of the following:

a common group, wherein the common group imposes no limitations on the group affiliation information of the group members;

a cooperative group, wherein the cooperative group limits the group affiliation information of the group members to a plurality of set related groups;

an internal group, wherein the internal group limits the group affiliation information of the group members to a set internal group; and an industry group, wherein the industry group limits the group affiliation information of the group members to one or more set industry types.

17. The one or more computer-readable media according to claim 15, wherein the selecting, according to the limiting condition, the group members within the group that do not satisfy the limiting condition comprises:

determining that the limiting condition corresponds to the target group type limits the group affiliation information of group members to a set group;

confirming a group needed to be set with an administrative member of the group; and according to a confirmation result returned by the administrative member, selecting, from the group, group members having group affiliation information unrelated to a group set by the administrative member.

18. The one or more computer-readable media according to claim 15, wherein the group set by the administrative member comprises:

at least one internal group to which the administrative member belongs; or at least one internal group to which the administrative member belongs and at least one external group to which other group members in the group belong, wherein the administrative member does not belong to the external group.

19. The one or more computer-readable media according to claim 15, wherein the acts further comprise:

determining that the target group type results in the group affiliation information among the group members in the group are not the same; and granting the group members in the group a privilege to mutually browse the group affiliation information.

20. The one or more computer-readable media according to claim 19, wherein the acts further comprise:

displaying a group message from a group member based on a communication session on a communication session interface corresponding to the communication session; and displaying group affiliation information of the group member in a related display region corresponding to the group message on the communication session interface.

* * * * *